(12) United States Patent  
Fotopoulou et al.

(10) Patent No.: US 12,367,883 B2  
(45) Date of Patent: Jul. 22, 2025

(54) MULTISIGNAL AUDIO CODING USING SIGNAL WHITENING AS PROCESSING

(71) Applicant: Fraunhofer-Gesellschaft zur Förderung der angewandten Forschung e.V., Munich (DE)

(72) Inventors: Eleni Fotopoulou, Erlangen (DE); Markus Multrus, Erlangen (DE); Sascha Dick, Erlangen (DE); Goran Markovic, Erlangen (DE); Pallavi Maben, Erlangen (DE); Srikanth Korse, Erlangen (DE); Stefan Bayer, Erlangen (DE); Sascha Disch, Erlangen (DE); Jürgen Herre, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 823 days.

(21) Appl. No.: 17/124,628

(22) Filed: Dec. 17, 2020

(65) Prior Publication Data

US 2021/0104249 A1    Apr. 8, 2021

Related U.S. Application Data

(63) Continuation of application No. PCT/EP2019/067256, filed on Jun. 27, 2019.

(30) Foreign Application Priority Data

Jul. 4, 2018  (EP) .................................. 18181767

(51) Int. Cl.  
*G06F 17/00*  (2019.01)  
*G06F 3/16*  (2006.01)  
(Continued)

(52) U.S. Cl.  
CPC ............ *G10L 19/008* (2013.01); *G06F 3/162* (2013.01); *G10L 19/03* (2013.01)

(58) Field of Classification Search  
CPC ........ G10L 19/03; G10L 19/008; G06F 3/162  
(Continued)

(56) References Cited

U.S. PATENT DOCUMENTS

| 9,646,619 B2 | 5/2017 | Purnhagen et al. |
| 10,083,701 B2 | 9/2018 | Kjoerling |

(Continued)

FOREIGN PATENT DOCUMENTS

| CN | 101115051 A | 1/2008 |
| CN | 104471641 A | 3/2015 |

(Continued)

OTHER PUBLICATIONS

EBU R128 specification document (Year: 2014).*

(Continued)

*Primary Examiner* — Paul C McCord  
(74) *Attorney, Agent, or Firm* — McClure, Qualey & Rodack, LLP

(57) ABSTRACT

A multisignal encoder for encoding at least three audio signals, including: a signal preprocessor for individually preprocessing each audio signal to obtain at least three preprocessed audio signals, wherein the preprocessing is performed so that a preprocessed audio signal is whitened with respect to the signal before preprocessing; an adaptive joint signal processor for performing a processing of the at least three preprocessed audio signals to obtain at least three jointly processed signals or at least two jointly processed signals and an unprocessed signal; a signal encoder for encoding each signal to obtain one or more encoded signals; and an output interface for transmitting or storing an encoded multisignal audio signal including the one or more (Continued)

encoded signals, side information relating to the preprocessing and side information relating to the processing.

19 Claims, 12 Drawing Sheets

(51) Int. Cl.
*G10L 19/008* (2013.01)
*G10L 19/03* (2013.01)

(58) Field of Classification Search
USPC .......................................................... 700/94
See application file for complete search history.

(56) References Cited

U.S. PATENT DOCUMENTS

| | | | |
|---|---|---|---|
| 10,236,008 B2 | 3/2019 | Helmrich | |
| 10,388,287 B2 | 8/2019 | Disch et al. | |
| 10,424,308 B2 | 9/2019 | Ehara | |
| 10,431,227 B2 | 10/2019 | Disch et al. | |
| 2007/0094012 A1 | 4/2007 | Pang et al. | |
| 2007/0174062 A1 | 7/2007 | Mehrotra et al. | |
| 2010/0286990 A1 | 11/2010 | Biswas et al. | |
| 2012/0155653 A1 | 6/2012 | Jax et al. | |
| 2014/0108020 A1 | 4/2014 | Sharma et al. | |
| 2015/0287417 A1 | 10/2015 | Disch et al. | |
| 2016/0140980 A1 | 5/2016 | Disch et al. | |
| 2016/0210974 A1* | 7/2016 | Disch | G10L 25/06 |
| 2017/0256267 A1 | 9/2017 | Disch et al. | |
| 2018/0040328 A1 | 2/2018 | Dick et al. | |
| 2018/0090151 A1 | 3/2018 | Dick | |
| 2019/0043515 A1 | 2/2019 | Cohen et al. | |

FOREIGN PATENT DOCUMENTS

| | | | | |
|---|---|---|---|---|
| CN | 105612766 A | 5/2016 | | |
| CN | 107592937 A | 1/2018 | | |
| CN | 108140394 A | 6/2018 | | |
| EP | 2676266 A1 | 12/2013 | | |
| EP | 2830054 A1 | 1/2015 | | |
| JP | 2009-524108 A | 6/2009 | | |
| JP | 2015011076 A | 1/2015 | | |
| JP | 2015535620 T | 12/2015 | | |
| JP | 2016-530556 | 9/2016 | | |
| JP | 2016-530556 A | 9/2016 | | |
| JP | 2016-224472 A | 12/2016 | | |
| JP | 2017167566 A | 9/2017 | | |
| RU | 2 651 229 C2 | 4/2018 | | |
| TW | 201528253 A | 7/2015 | | |
| TW | 201636999 A | 10/2016 | | |
| TW | 201701271 A | 1/2017 | | |
| WO | WO-2012075246 A2 * | 6/2012 | ........... | G10L 19/008 |
| WO | 2014/013070 A1 | 1/2014 | | |
| WO | 2015/010948 A1 | 1/2015 | | |
| WO | 2015010947 A1 | 1/2015 | | |
| WO | 2016142375 A1 | 9/2016 | | |
| WO | 2017125544 A1 | 7/2017 | | |

OTHER PUBLICATIONS

ID3 draft specification (Year: 1998).*
Japanese language office action dated Mar. 18, 2022, issued in application No. JP 2021-500045.
English language translation of office action dated Mar. 18, 2022, issued in application No. JP 2021-500045 (pp. 1-22 of attachment).
Korean languge Notice of Allowance dated Aug. 21, 2023, issued in application No. KR 10-2021-7003630.
English language translation of Notice of Allowance dated Aug. 21, 2023.
ISO/IEC 23003-1: "Information technology—MPEG audio technologies Part 1: MPEG Surround", 2007.
ISO/IEC 23003-3: "Information technology—MPEG audio technologies Part 3: Unified speech and audio coding".
ETSI TS 103 190 V1.1.1 (Apr. 2014): "Digital Audio Compression (AC-4) Standard".
3GPP TS 26.445 V15.0.0 (Jun. 2018): "Codec for Encanced Voice Services (EVS); Detailed algorithmic description".
J. Herre et al.: "Mpeg-H 3D Audio—The New Standard for Coding of Immersive Spatial Audio," Journal of Selected Topics in Signal Processing, vol. 9, No. 5, pp. 770-779, Aug. 2015.
D. Yang et al.: "High-fidelity multichannel audio coding with Karhunen-Loeve transform," Transactions on Speech and Audio Processing, vol. 11, No. 4, pp. 365-380, Jul. 2003.
F. Schuh et al.: "Efficient Multichannel Audio Transform Coding with Low Delay and Complexity," in AES Convention, Los Angeles, Sep. 20, 2016.
International Search Report, May 9, 2019, from PCT/EP2019/067256.
Written Opinion, May 9, 2019, from PCT/EP2019/067256.
Russian language office action dated Jun. 7, 2021, issued in application No. RU 2021102388.
English language translation of office action dated Jun. 7, 2021, issued in application No. RU 2021102388.
Chinese language office action dated Sep. 5, 2023, issued in application No. CN 201980056603.4.
English language translation of office action dated Sep. 5, 2023 (pp. 1-5 of attachment).
Chinese language office action dated May 27, 2024, issued in application No. CN 201980056603.4.
English language translation of office action dated May 27, 2024 (pp. 1-10 of attachment).
Japanese language office action dated Jan. 10, 2025, issued in application No. JP 2023-191220, with English language translation (pp. 10-25 of attachment).

* cited by examiner definition for channel pair side bits

|   | 0 | 1 | 2 | 3 | 4 | 5 |
|---|---|---|---|---|---|---|
| 0 |   | 0 | 1 | 2 | 3 | 4 |
| 1 |   |   | 5 | 6 | 7 | 8 |
| 2 |   |   |   | 9 | 10 | 11 |
| 3 |   |   |   |   | 12 | 13 |
| 4 |   |   |   |   |   | 14 |
| 5 |   |   |   |   |   |   | e.g. 6 channels
– 15 possibilities (from 0 to 14 )
– 4 bits

Fig. 4

MULTISIGNAL AUDIO CODING USING SIGNAL WHITENING AS PROCESSING

CROSS-REFERENCES TO RELATED APPLICATIONS

This application is a continuation of copending International Application No. PCT/EP2019/067256, filed Jun. 27, 2019, which is incorporated herein by reference in its entirety, and additionally claims priority from European Application No. EP 18 181 767.7, filed Jul. 4, 2018, which is incorporated herein by reference in its entirety.

BACKGROUND OF THE INVENTION

Embodiments relate to an MDCT-based multi-signal encoding and decoding system with signal-adaptive joint channel processing, wherein the signal can be a channel, and the multisignal is a multichannel signal or, alternatively an audio signal being a component of a sound field description such as an Ambisonics component, i.e., W, X, Y, Z in first order Ambisonics or any other component in a higher order Ambisonics description. The signal can also be a signal of an A-format or B-format or any other format description of a sound field.

- In MPEG USAC [1], joint stereo coding of two channels is performed using Complex Prediction, MPS 2-1-2 or Unified Stereo with band-limited or full-band residual signals.
- MPEG Surround [2] hierarchically combines OTT and TTT Boxes for joint coding of multichannel audio with or without transmission of residual signals.
- MPEG-H Quad Channel Elements [3] hierarchically apply MPS 2-1-2 Stereo boxes followed by Complex Prediction/MS Stereo boxes building a "fixed" 4×4 remixing tree.
- AC4 [4] introduces new 3-, 4- and 5-channel elements that allow for remixing transmitted channels via a transmitted mix matrix and subsequent joint stereo coding information.
- Prior publications suggest to use orthogonal transforms like Karhunen-Loeve Transform (KLT) for Enhanced Multichannel Audio Coding [5].
- The Multichannel Coding Tool (MCT) [6]-which supports joint coding of more than two channels, enables flexible and signal-adaptive joint channel coding in the MDCT domain. This is achieved by an iterative combination and concatenation of stereo coding techniques such as real-valued complex stereo prediction as well as rotation stereo coding (KLT) of two designated channels.

In the 3D Audio context, loudspeaker channels are distributed in several height layers, resulting in horizontal and vertical channel pairs. Joint coding of only two channels as defined in USAC is not sufficient to consider the spatial and perceptual relations between channels. MPEG Surround is applied in an additional pre-/postprocessing step, residual signals are transmitted individually without the possibility of joint stereo coding, e.g. to exploit dependencies between left and right vertical residual signals. In AC-4 dedicated N-channel elements are introduced that allow for efficient encoding of joint coding parameters, but fail for generic speaker setups with more channels as proposed for new immersive playback scenarios (7.1+4, 22.2). MPEG-H Quad Channel element is also restricted to only 4 channels and cannot be dynamically applied to arbitrary channels but only a pre-configured and fixed number of channels. MCT introduces the flexibility of signal-adaptive joint channel coding of arbitrary channels, but stereo processing is conducted on windowed and transformed non-normalized (non whitened) signals. Furthermore, coding of the prediction coefficients or angles in each band for each stereo box needs a significant number of bits.

SUMMARY

According to an embodiment, a multisignal encoder for encoding at least three audio signals may have: a signal preprocessor for individually preprocessing each audio signal to acquire at least three preprocessed audio signals, wherein the preprocessing is performed so that a preprocessed audio signal is whitened with respect to the signal before preprocessing; an adaptive joint signal processor for performing a processing of the at least three preprocessed audio signals to acquire at least three jointly processed signals or at least two jointly processed signals and an unprocessed signal; a signal encoder for encoding each signal to acquire one or more encoded signals; and an output interface for transmitting or storing an encoded multisignal audio signal including the one or more encoded signals, side information relating to the preprocessing and side information relating to the processing.

According to another embodiment, a multisignal decoder for decoding an encoded signal may have: a signal decoder for decoding at least three encoded signals; a joint signal processor for performing a joint signal processing in accordance with side information included in the encoded signal to acquire at least three processed decoded signals; and a post processor for post processing the at least three processed decoded signals in accordance with side information included in the encoded signal, wherein the post processing is performed so that the post processed signals are less white than the signals before post processing, and wherein the post processed signals represent a decoded audio signal.

According to another embodiment, a method for performing multisignal encoding at least three audio signals may have the steps of: individually preprocessing each audio signal to acquire at least three preprocessed audio signals, wherein the preprocessing is performed so that a preprocessed audio signal is whitened with respect to the signal before preprocessing; performing a processing of the at least three preprocessed audio signals to acquire at least three jointly processed signals or at least two jointly processed signals and a signal to be encoded individually; encoding each signal to acquire one or more encoded signals; and transmitting or storing an encoded multisignal audio signal including the one or more encoded signals, side information relating to the preprocessing and side information relating to the processing.

According to another embodiment, a method for multisignal decoding an encoded signal may have the steps of: individually decoding at least three encoded signals; performing a joint signal processing in accordance with side information included in the encoded signal to acquire at least three processed decoded signals; and post processing the at least three processed decoded signals in accordance with side information included in the encoded signal, wherein the post processing is performed so that the post processed signals are less white than the signals before post processing, and wherein the post processed signals represent a decoded audio signal.

Another embodiment may have a non-transitory digital storage medium having a computer program stored thereon to perform the method for performing multisignal encoding at least three audio signals, the method having the steps of: individually preprocessing each audio signal to acquire at least three preprocessed audio signals, wherein the preprocessing is performed so that a preprocessed audio signal is whitened with respect to the signal before preprocessing; performing a processing of the at least three preprocessed audio signals to acquire at least three jointly processed signals or at least two jointly processed signals and a signal to be encoded individually; encoding each signal to acquire one or more encoded signals; and transmitting or storing an encoded multisignal audio signal including the one or more encoded signals, side information relating to the preprocessing and side information relating to the processing, when said computer program is run by a computer.

Another embodiment may have a non-transitory digital storage medium having a computer program stored thereon to perform the method for multisignal decoding an encoded signal, the method having the steps of: individually decoding at least three encoded signals; performing a joint signal processing in accordance with side information included in the encoded signal to acquire at least three processed decoded signals; and post processing the at least three processed decoded signals in accordance with side information included in the encoded signal, wherein the post processing is performed so that the post processed signals are less white than the signals before post processing, and wherein the post processed signals represent a decoded audio signal, when said computer program is run by a computer.

Another embodiment may have an encoded signal, having: at least three individually encoded signals; side information related to a preprocessing performed in order to acquire the three individually encoded signals; and side information related to a pairwise processing performed for acquiring the at least three individually encoded signals, and wherein the encoded signal includes, for each of the at least three encoded signals acquired by multisignal encoding, an energy scaling value or, for each one of the individually encoded signals, a bit distribution value.

The present invention is based on the finding that a multi-signal encoding efficiency is substantially enhanced by performing the adaptive joint signal processing not on the original signals but on preprocessed audio signals where this pre-processing is performed so that a preprocessed audio signal is whitened with respect to the signal before pre-processing. With respect to the decoder side, this means that a post processing is performed subsequent to the joint signal processing to obtain at least three processed decoded signals. These at least three processed decoded signals are post processed in accordance with side information included in the encoded signal, wherein the post processing is performed in such a way that the post processed signals are less white than the signals before post processing. The post processed signals finally represent, either directly or subsequent to further signal processing operations, the decoded audio signal, i.e., the decoded multi-signal.

Especially for immersive 3D audio formats, efficient multichannel coding exploiting the properties of a plurality of signals are obtained to reduce the amount of transmission data while preserving the overall perceptual audio quality. In an implementation, a signal adaptive joint coding within a multichannel system is performed using perceptually whitened and, additionally, inter-channel level difference (ILD) compensated spectra. A joint coding is performed advantageously using a simple per band M/S transform decision that is driven based on an estimated number of bits for an entropy coder.

A multi-signal encoder for encoding at least three audio signals comprises a signal preprocessor for individually preprocessing each audio signal to obtain at least three preprocessed audio signals, where the preprocessing is performed so that the preprocessed audio signal is whitened with respect to the signal before preprocessing. An adaptive joint signal processing of the at least three preprocessed audio signals is performed to obtain at least three jointly processed signals. This processing operates on whitened signals. The preprocessing results in the extraction of certain signal characteristics such as a spectral envelope or so that, if not extracted, would reduce the efficiency of the joint signal processing such as a joint stereo or a joint multichannel processing. Additionally, in order to enhance the joint signal processing efficiency, a broadband energy normalization of the at least three preprocessed audio signals is performed so that each preprocessed audio signal has a normalized energy. This broadband energy normalization is signaled into the encoded audio signal as side information so that this broadband energy normalization can be reversed on the decoder side subsequent to inverse joint stereo or joint multichannel signal processing. By means of this advantageous additional broadband energy normalization procedure, the adaptive joint signal processing efficiency is enhanced so that the number of bands or even the number of full frames that can be subjected to mid/side processing in contrast to left/right processing (dual mono processing) is substantially enhanced. The efficiency of the whole stereo encoding process is enhanced more and more the higher the number of bands or even full frames that are subjected to common stereo or multichannel processing such as mid/side processing becomes.

The lowest efficiency is obtained, from the stereo processing view, when the adaptive joint signal processor has to adaptively decide, for a band or for a frame that this band or frame is to be processed by "dual mono" or left/right processing. Here, the left channel and the right channel are processed as they are, but naturally in the whitened and energy normalized domain. When, however, the adaptive joint signal processor adaptively determines, for a certain band or frame that a mid/side processing is performed, the mid signal is calculated by adding the first and the second channel and the side signal is calculated by calculating the difference from the first and the second channel of the channel pair. Typically, the mid signal is, with respect to its value range, comparable to one of the first and the second channels, but the side signal will typically be a signal with a small energy that can be encoded with high efficiency or, even in the most advantageous situation, the side signal is zero or close to zero so that spectral regions of the side signal can even be quantized to zero and, therefore, be entropy encoded in a highly efficient way. This entropy encoding is performed by the signal encoder for encoding each signal to obtain one or more encoded signals and the output interface of the multi-signal encoder transmits or stores an encoded multi-signal audio signal comprising the one or more encoded signals, side information relating to the preprocessing and side information relating to the adaptive joint signal processing.

On the decoder-side, the signal decoder that typically comprises an entropy decoder decodes the at least three encoded signals typically relying on an advantageous included bit distribution information. This bit distribution information is included as side information in the encoded multi-signal audio signal and can, for example, be derived in the encoder-side by looking at the energy of the signals at the input into the signal (entropy) encoder. The output of the signal decoder within the multi-signal decoder is input into a joint signal processor for performing a joint signal processing in accordance with side information included in the encoded signal to obtain at least three processed decoded signals. This joint signal processor advantageously undoes the joint signal processing performed on the encoder-side and, typically, performs an inverse stereo or inverse multi-channel processing. In the advantageous implementation, the joint signal processor applies a processing operation to calculate left/right signals from mid/side signals. When, however, the joint signal processor determines from the side information that, for a certain channel pair, a dual mono processing is already there, this situation is noted and used in the decoder for further processing.

The joint signal processor on the decoder-side can be, as the adaptive joint signal processor on the encoder-side, a processor operating in the mode of a cascaded channel-pair tree or a simplified tree. A simplified tree also represents some kind of cascaded processing, but the simplified tree is different from the cascaded channel pair tree in that the output of a processed pair cannot be an input into another to be processed pair.

It can be the case that, with respect to a first channel pair that is used by the joint signal processor on the multi-signal decoder side in order to start the joint signal processing, this first channel pair that was the last channel pair processed on the encoder side has, for a certain band, a side information indicating dual mono but, these dual mono signals can be used, later on in a channel pair processing as a mid signal or a side signal. This is signaled by the corresponding side information related to a pair-wise processing performed for obtaining the at least three individually encoded channels to be decoded on the decoder-side.

Embodiments relate to an MDCT-based multi-signal encoding and decoding system with signal-adaptive joint channel processing, wherein the signal can be a channel, and the multisignal is a multichannel signal or, alternatively an audio signal being a component of a sound field description such as an Ambisonics component, i.e., W, X, Y, Z in first order Ambisonics or any other component in a higher order Ambisonics description. The signal can also be a signal of an A-format or B-format or any other format description of a sound field.

Subsequently, further advantages of embodiments are indicated. The codec uses new concepts to merge the flexibility of signal adaptive joint coding of arbitrary channels as described in [6] by introducing the concepts described in [7] for joint stereo coding. These are:
a) Use of perceptually whitened signals for further coding (similar to the way they are used in a speech coder). This has several advantages:
  Simplification of the codec architecture
  Compact representation of the noise shaping characteristics/masking threshold (e.g. as LPC coefficients)
  Unifies transform and speech codec architecture and thus enables combined audio/speech coding
b) Use of a ILD parameters of arbitrary channels to efficiently code panned sources
c) Flexible bit distribution among the processed channels based on the energy.

The codec furthermore uses Frequency Domain Noise Shaping (FDNS) to perceptually whiten the signal with the rate-loop as described in [8] combined with the spectral envelope warping as described in [9]. The codec further normalized the FDNS-whitened spectrum towards the mean energy level using ILD parameters. Channel pairs for joint coding are selected in an adaptive manner as described in [6], where the stereo coding consist of a band-wise M/S vs L/R decision. The band-wise M/S decision is based on the estimated bitrate in each band when coded in the L/R and in the M/S mode as described in [7]. Bitrate distribution among the bandwise M/S processed channels is based on the energy.

BRIEF DESCRIPTION OF THE DRAWINGS

Embodiments of the present invention will be detailed subsequently referring to the ap-pended drawings, in which:

FIG. 4 illustrates an indexing scheme of channel pairs in an implementation;

FIG. 6 illustrates a procedure performed by the adaptive joint signal processor of FIG. 5a;

DETAILED DESCRIPTION OF THE INVENTION

Figure 1:
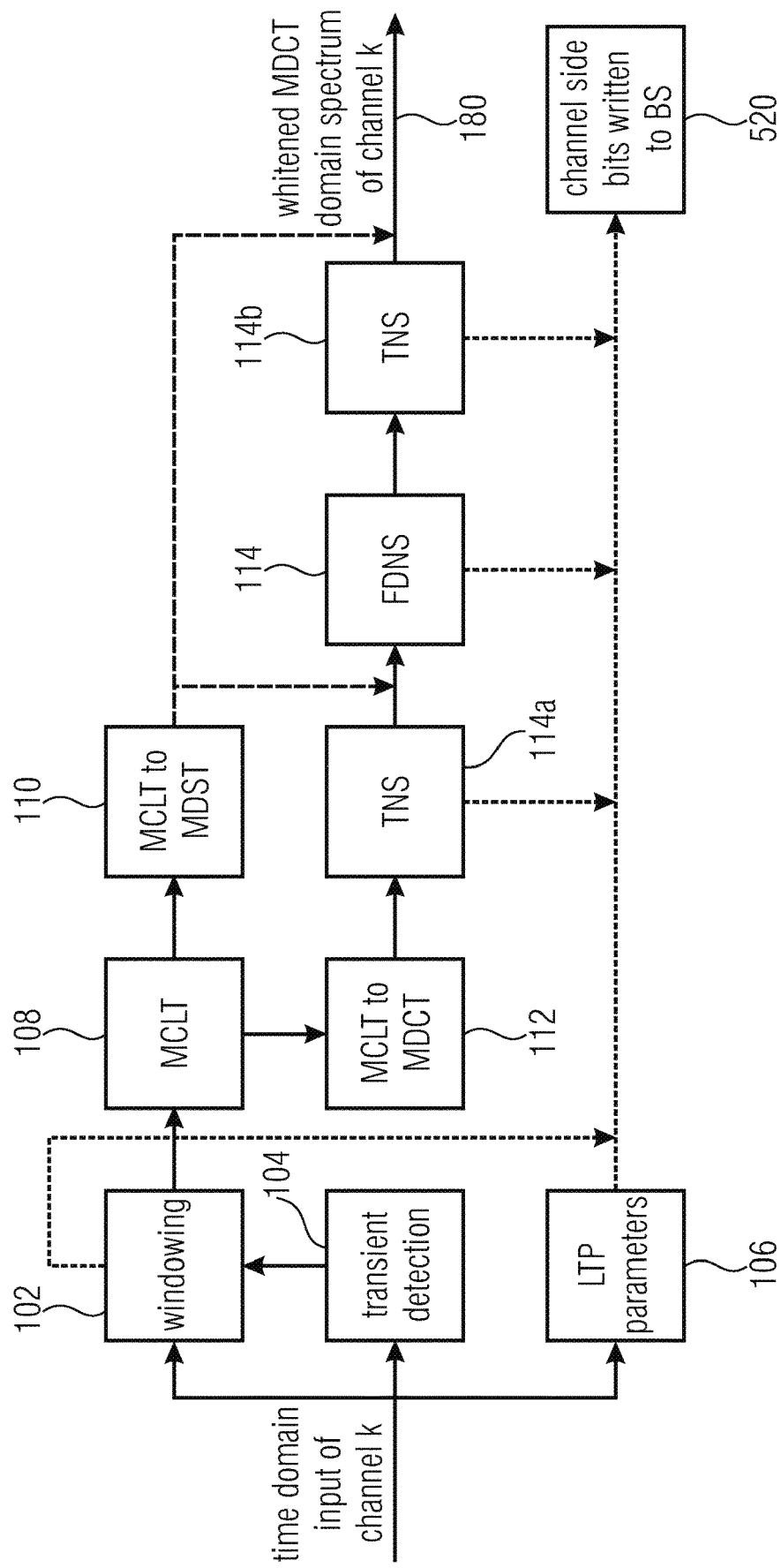
FIG. 1 illustrates a block diagram of a single-channel preprocessing in an implementation.

FIG. 5 illustrates an implementation of a multi-signal encoder for encoding at least three audio signals. The at least three audio signals are input into a signal processor 100 for individually preprocessing each audio signal to obtain at least three preprocessed audio signals 180, wherein the preprocessing is performed so that the preprocessed audio signals are whitened with respect to the corresponding signals before preprocessing. The at least three preprocessed audio signals 180 are input into an adaptive joint signal processor 200 that is configured for performing a processing of the at least three preprocessed audio signals to obtain at least three jointly processed signals or, in an embodiment, at least two jointly processed signals and an unprocessed signal as will be explained later. The multi-signal encoder comprises a signal encoder 300 that is connected to an output of the adaptive joint signal processor 200 and that is configured for encoding each signal output by the adaptive joint signal processor 200 to obtain one or more encoded signals. These encoded signals at the output of the signal encoder 300 are forwarded to an output interface 400. The output interface 400 is configured for transmitting or storing an encoded multi-signal audio signal 500 where the encoded multisignal audio signal 500 at the output of the output interface 400 comprises the one or more encoded signals as generated by the signal encoder 300, side information 520 relating to the preprocessing performed by the signal preprocessor 200, i.e., whitening information, and, additionally the encoded multi-signal audio signal additionally comprises side information 530 relating to the processing performed by the adaptive joint signal processor 200, i.e., side information relating to the adaptive joint signal processing.

In an implementation, the signal encoder 300 comprises a rate loop processor that is controlled by bit distribution information 536 that is generated by the adaptive joint signal processor 200 and that is not only forwarded from block 200 to block 300 but that is also forwarded, within the side information 530, to the output interface 400 and, therefore, into the encoded multisignal audio signal. The encoded multi-signal audio signal 500 is typically generated in a frame-by-frame way where the framing and, typically, a corresponding windowing and time-frequency conversion is performed within the signal preprocessor 100.

Figure 5A:
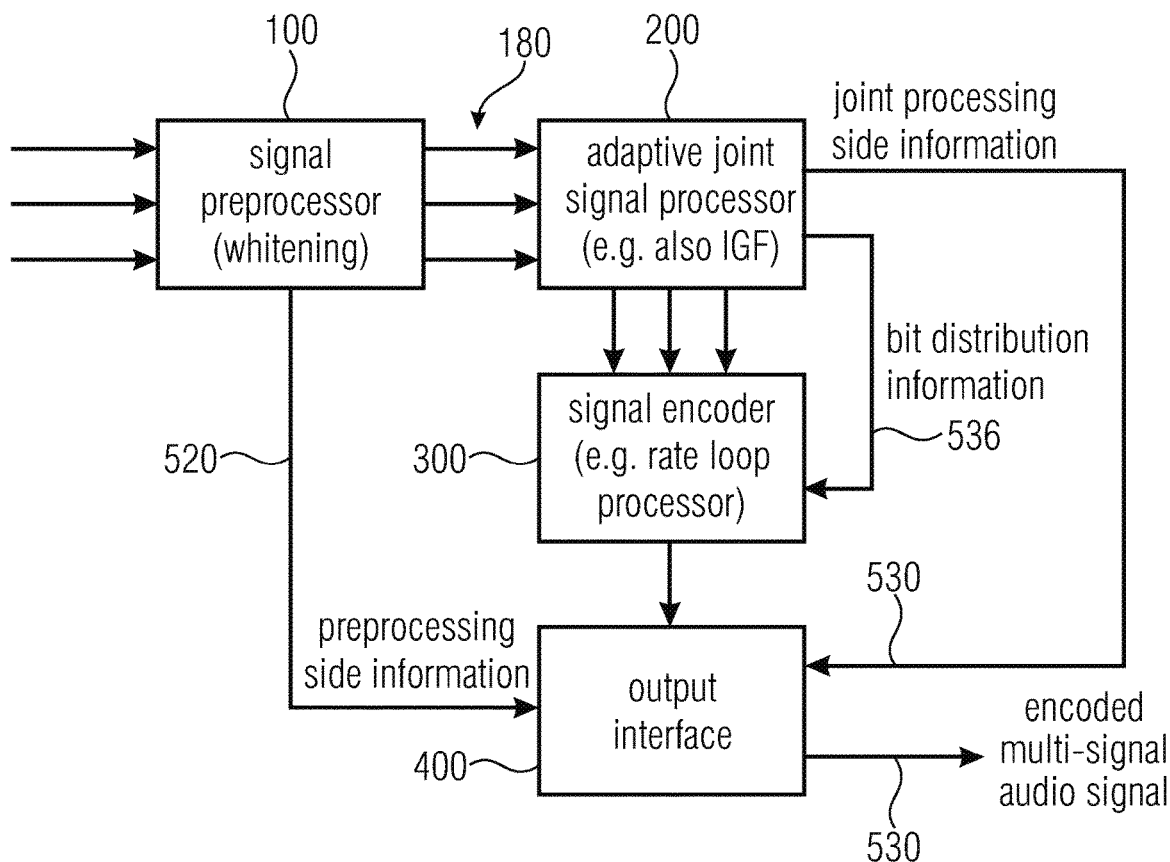
FIG. 5a illustrates an implementation of the multi-signal encoder in accordance with the present invention.
Figure 5B:
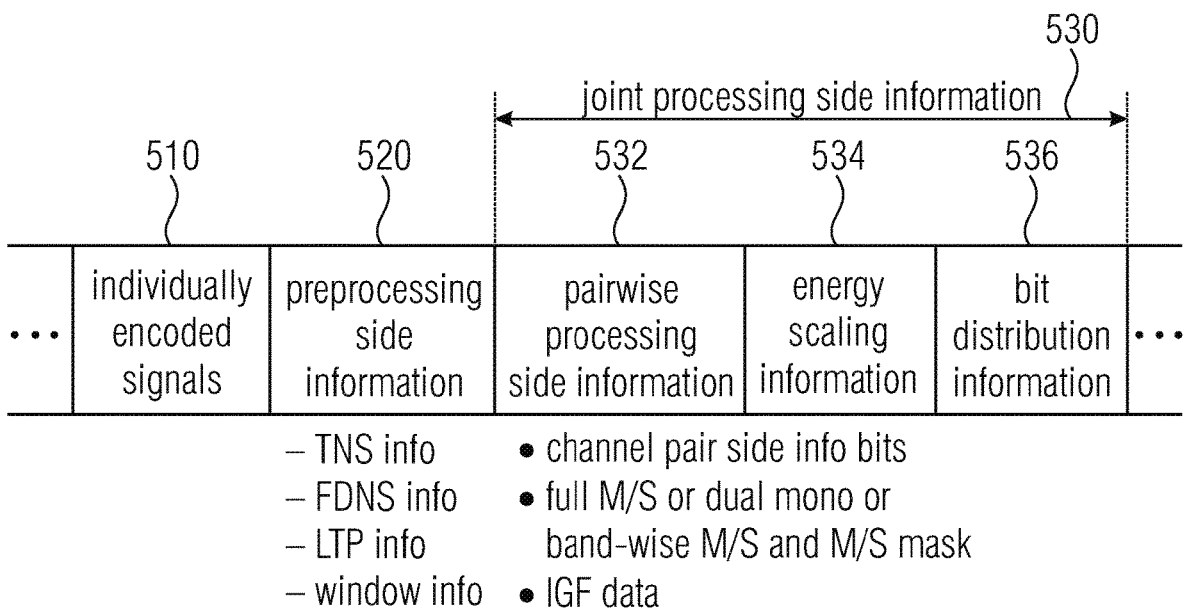
FIG. 5b illustrates a schematic representation of an encoded multi-channel audio signal frame.

An exemplary illustration of a frame of the encoded multi-signal audio signal 500 is illustrated in FIG. 5b. FIG. 5b illustrates a bit stream portion 510 for the individually encoded signals as generated by block 300. Block 520 is for the preprocessing side information generated by block 100 and forwarded to the output interface 400. Additionally, a joint processing side information 530 is generated by the adaptive joint signal processor 200 of FIG. 5a and introduced into the encoded multi-signal audio signal frame illustrated in FIG. 5b. To the right of the illustration in FIG. 5b, the next frame of the encoded multi-signal audio signal would be written into a serial bit stream while, to the left of the illustration in FIG. 5b, an earlier frame of the encoded multisignal audio signal would be written.

As will be illustrated later on, the preprocessing comprises a temporal noise shaping processing and/or a frequency domain noise shaping processing or LTP (long term prediction) processing or windowing processing operations. The corresponding preprocessing side information 550 may comprise at least one of the temporal noise shaping (TNS) information, frequency domain noise shaping (FDNS) information, long term prediction (LTP) information or windowing or window information.

Temporal noise shaping comprises a prediction of a spectral frame over frequency. A spectral value with a higher frequency is predicted using a weighted combination of spectral values having lower frequencies. The TNS side information comprises the weights of the weighted combination that are also known as LPC coefficients derived by the prediction over frequency. The whitened spectral values are the prediction residual values, i.e., the differences, per spectral value, between the original spectral value and the predicted spectral value. On the decoder side, an inverse prediction of an LPC synthesis filtering is performed in order to undo the TNS processing on the encoder side.

FDNS processing comprises weighting spectral values of a frame using weighting factors for the corresponding spectral values, where the weighting values are derived from the LPC coefficients calculated from a block/frame of the windowed time domain signal. The FDNS side information comprises a representation of the LPC coefficients derived from the time domain signal.

Another whitening procedure also useful for the present invention is a spectral equalization using scale factors so that the equalized spectrum represents a version being whiter than a non-equalized version. The side information would be the scale factors used for weighting and the inverse procedure comprises undoing the equalization on the decoder side using the transmitted scale factors.

Another whitening procedure comprises performing an inverse filtering of the spectrum using an inverse filter controlled by the LPC coefficients derived from the time domain frame as known in the art of speech coding. The side information is the inverse filter information and this inverse filtering is undone in the decoder using the transmitted side information.

Another whitening procedure comprises performing an LPC analysis in the time domain and calculating time domain residual values that are then converted into the spectral range. Typically, the thus obtained spectral values are similar to the spectral values obtained by FDNS. On the decoder side, the postprocessing comprises performing the LPC synthesis using the transmitted LPC coefficients representation.

The joint processing side information 530 comprises, in an implementation, a pair-wise processing side information 532, an energy scaling information 534 and a bit distribution information 536. The pairwise processing side information may comprise at least one of the channel pair side information bits, a full mid/side or dual mono or band-wise mid/side information and, in case of a band-wise mid/side indication, a mid/side mask indicating, for each bandwidth in a frame, whether the band is processed by mid/side or L/R processing. The pairwise processing side information may additionally comprise intelligent gap filling (IGF) or other bandwidth extension information such as SBR (spectral band replication) information or so.

The energy scaling information 534 may comprise, for each whitened, i.e., preprocessed signal 180, an energy scaling value and a flag, indicating, whether the energy scaling is an upscaling or a downscaling. In case of eight channels, for example, block 534 would comprise eight scaling values such as eight quantized ILD values and eight flags indicating, for each of the eight channels, whether an upscaling or downscaling has been done within the encoder or has to be done within the decoder. An upscaling in the encoder is necessary, when the actually energy of a certain preprocessed channel within a frame is below the mean energy for the frame among all channels, and a downscaling is necessary, when the actual energy of a certain channel within the frame is above the mean energy over all channels within the frame. The joint processing side information may comprise a bit distribution information for each of the jointly processed signals or for each jointly processed signals and, if available, an unprocessed signal, and this bit distribution information is used by the signal encoder 300 as illustrated in FIG. 5a and is, correspondingly used by the used signal decoder illustrated in FIG. 10 that receives this bit stream information via an input interface from the encoded signal.

Figure 6:
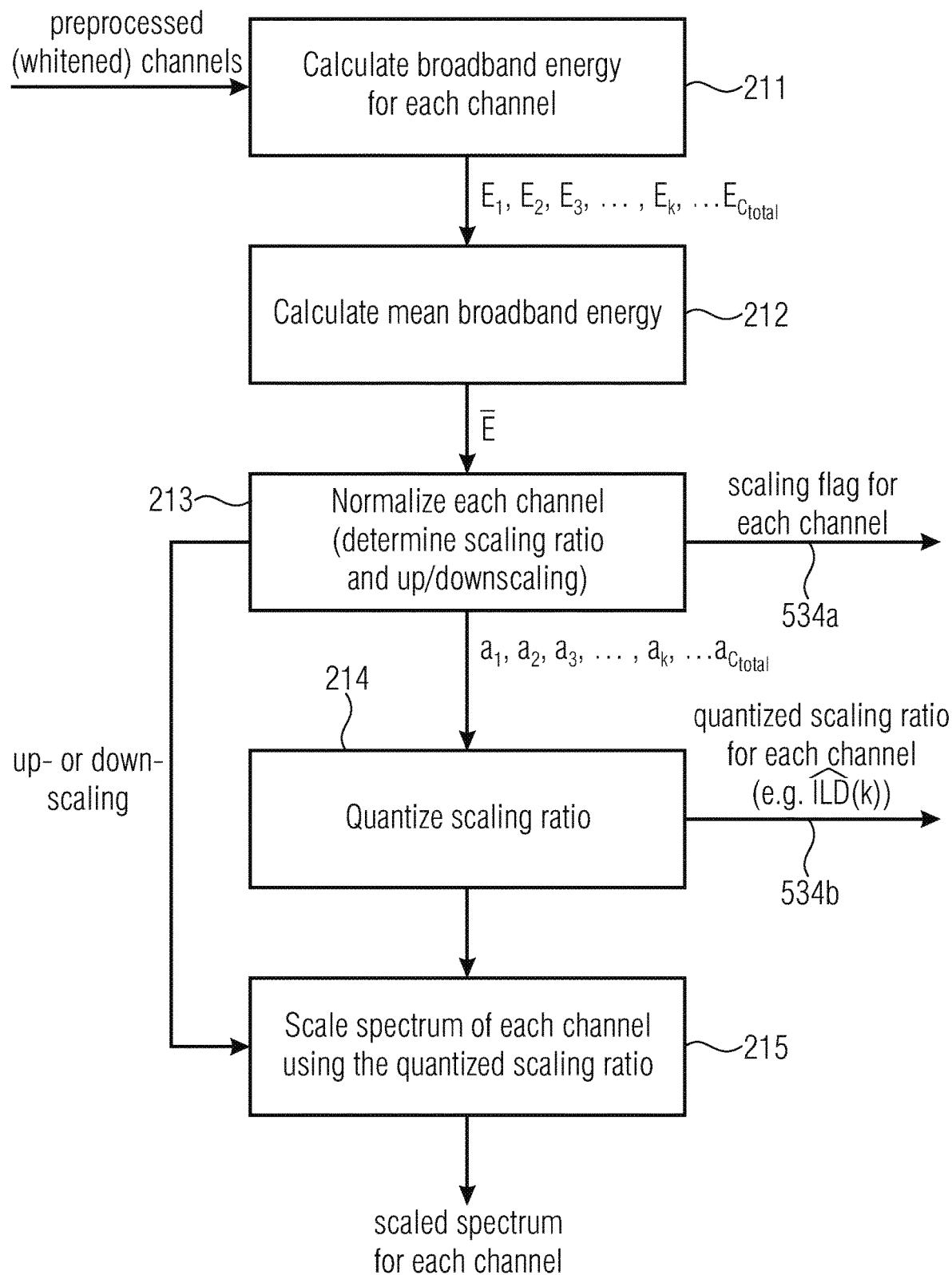

FIG. 6 illustrates an implementation of the adaptive joint signal processor. The adaptive joint signal processor 200 is configured to perform a broadband energy normalization of the at least three preprocessed audio signals, so that each preprocessed audio signal has a normalized energy. The output interface 400 is configured to include, as a further side information, a broadband energy normalization value for each preprocessed audio signal where this value corresponds to the energy scaling information 534 of FIG. 5b. FIG. 6 illustrates an implementation of the broadband energy normalization. In step 211, a broadband energy for each channel is calculated. The input into block 211 is constituted by the preprocessed (whitened) channels. The result is a broadband energy value for each channel of the $C_{total}$ channels. In block 212, a mean broadband energy is calculated typically by adding together the individual values and by dividing the individual values by the number of channels. However, other mean calculating procedures such a geometric mean or so can be performed.

In step 213, each channel is normalized. To this end, a scaling factor or value and an up- or downscaling information is determined. Block 213, therefore, is configured to output the scaling flag for each channel indicated at 534a. In block 214, the actual quantization of the scaling ratio determined in block 212 is performed, and this quantized scaling ratio is output at 534b for each channel. This quantized scaling ratio is also indicated as inter-channel level difference $\widehat{ILD}$ (k), i.e., for a certain channel k with respect to a reference channel having the mean energy. In block 215, the spectrum of each channel is scaled using the quantized scaling ratio. The scaling operation in block 215 is controlled by the output of block 213, i.e., by the information whether an upscaling or downscaling is to be performed. The output of block 215 represents a scaled spectrum for each channel.

Figure 7:
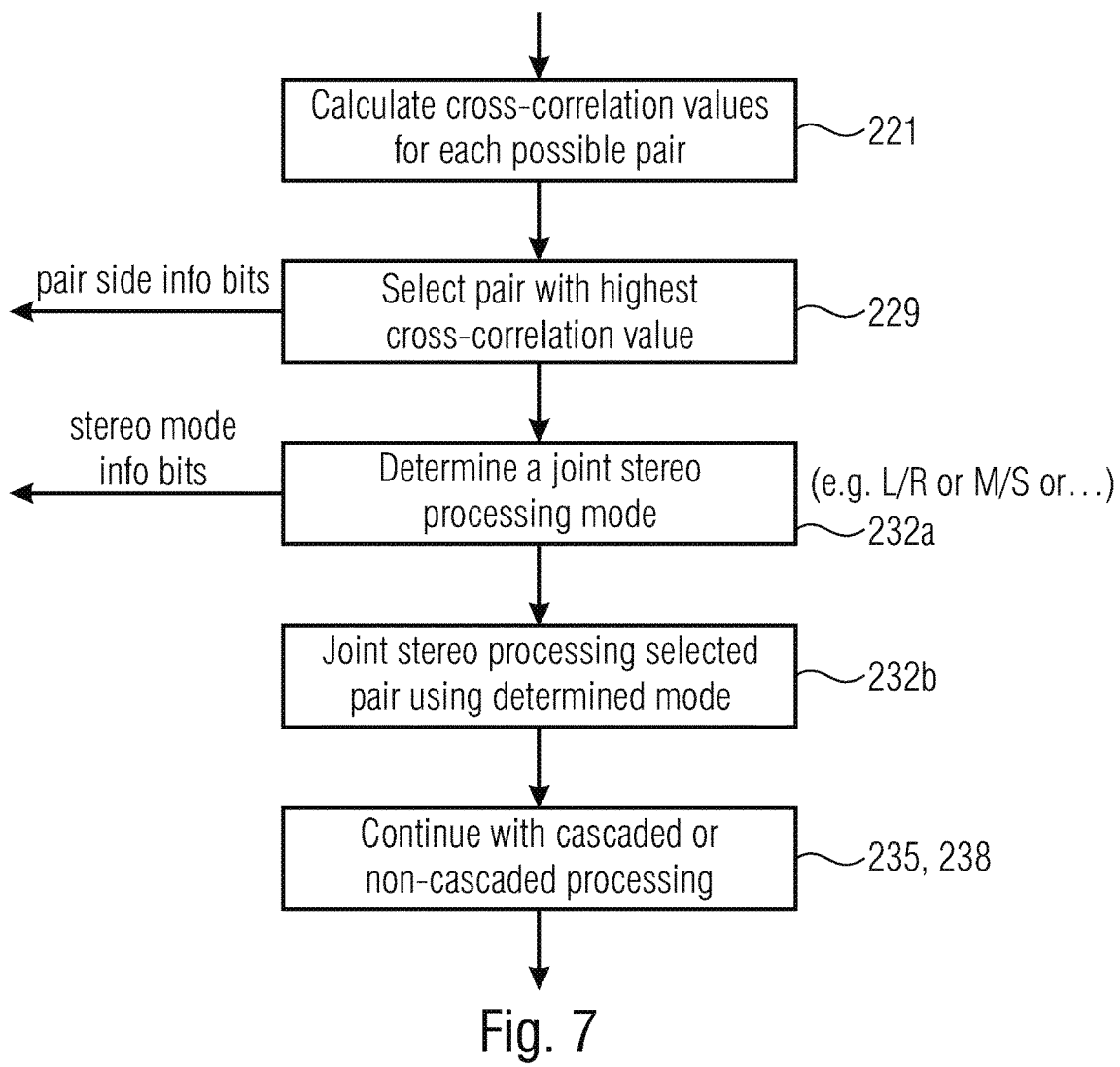
FIG. 7 illustrates an implementation performed by the adaptive joint signal processor of FIG. 8.

FIG. 7 illustrates an implementation of the adaptive joint signal processor 200 with respect to the cascaded pair processing. The adaptive joint signal processor 200 is configured to calculate cross-correlation values for each possible channel pair as indicated in block 221. Block 229 illustrates the selection of a pair with the highest cross-correlation value and in block 232a, a joint stereo processing mode is determined for this pair. A joint stereo processing mode may consist of mid/side coding for the full frame, mid/side coding in a band-wise manner, i.e., where it is determined for each band of a plurality of bands, whether this band is to be processed in mid/side or L/R mode, or, whether, for the actual frame, a full band dual-mono processing is to be performed for this specific pair under consideration. In block 232b, the joint stereo processing for the selected pair is actually performed using the mode as determined in block 232a.

In block 235, 238, the cascaded processing with the full tree or a simplified tree processing or a non-cascaded processing are continued until a certain termination criterion. At the certain termination criterion, a pair indication output by, for example, block 229 and a stereo mode processing information output by block 232a are generated and input into the bit stream in the pairwise processing side information 532 explained with respect to FIG. 5b.

Figure 8:
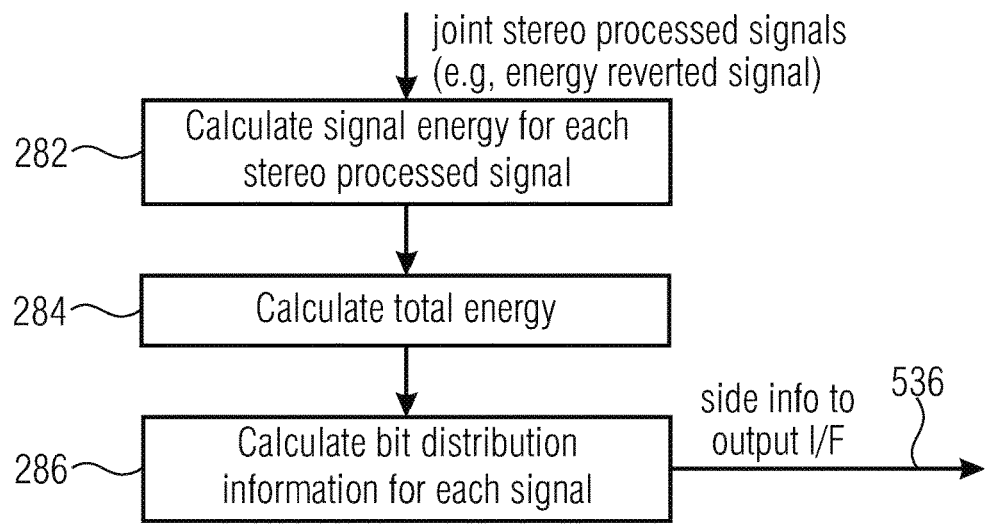
FIG. 8 illustrates another advantageous implementation performed by the adaptive joint signal processor of FIG. 5.

FIG. 8 illustrates an implementation of the adaptive joint signal processor for the purpose of preparing for the signal encoding performed by the signal encoder 300 of FIG. 5a. To this end, the adaptive joint signal processor 200 calculates a signal energy for each stereo processed signal in block 282. Block 282 receives, as an input, joint stereo processed signals and, in case of a channel that has not been subjected to a stereo processing since this channel was not found to have a sufficient cross correlation with any other channel to form a useful channel pair, this channel is input into block 282 with a reversed or modified or non-normalized energy. This is generally indicated as an "energy reverted signal", but the energy normalization performed in FIG. 6, block 215 does not necessarily have to be fully reverted. There exists certain alternatives for dealing with a channel signal that has not been found to be useful together with another channel for the channel pair processing. One procedure is to reverse the scaling initially performed in block 215 of FIG. 6. Another procedure is to only partly reverse the scaling or another procedure is to weight the scaled channel in a certain different way, as the case may be.

In block 284, a total energy among all signals output by the adaptive joint signal processor 200 is calculated. A bit distribution information is calculated in block 286 for each signal based on the signal energy for each stereo processed signal or, if available, an energy reverted or energy weighted signal and based on the total energy output by block 284. This side information 536 generated by block 286 is, on the one hand, forwarded to the signal encoder 300 of FIG. 5a and is, additionally, forwarded to the output interface 400 via logic connection 530 so that this bit distribution information is included in the encoded multi-signal audio signal 500 of FIG. 5a or FIG. 5b.

Figure 9:
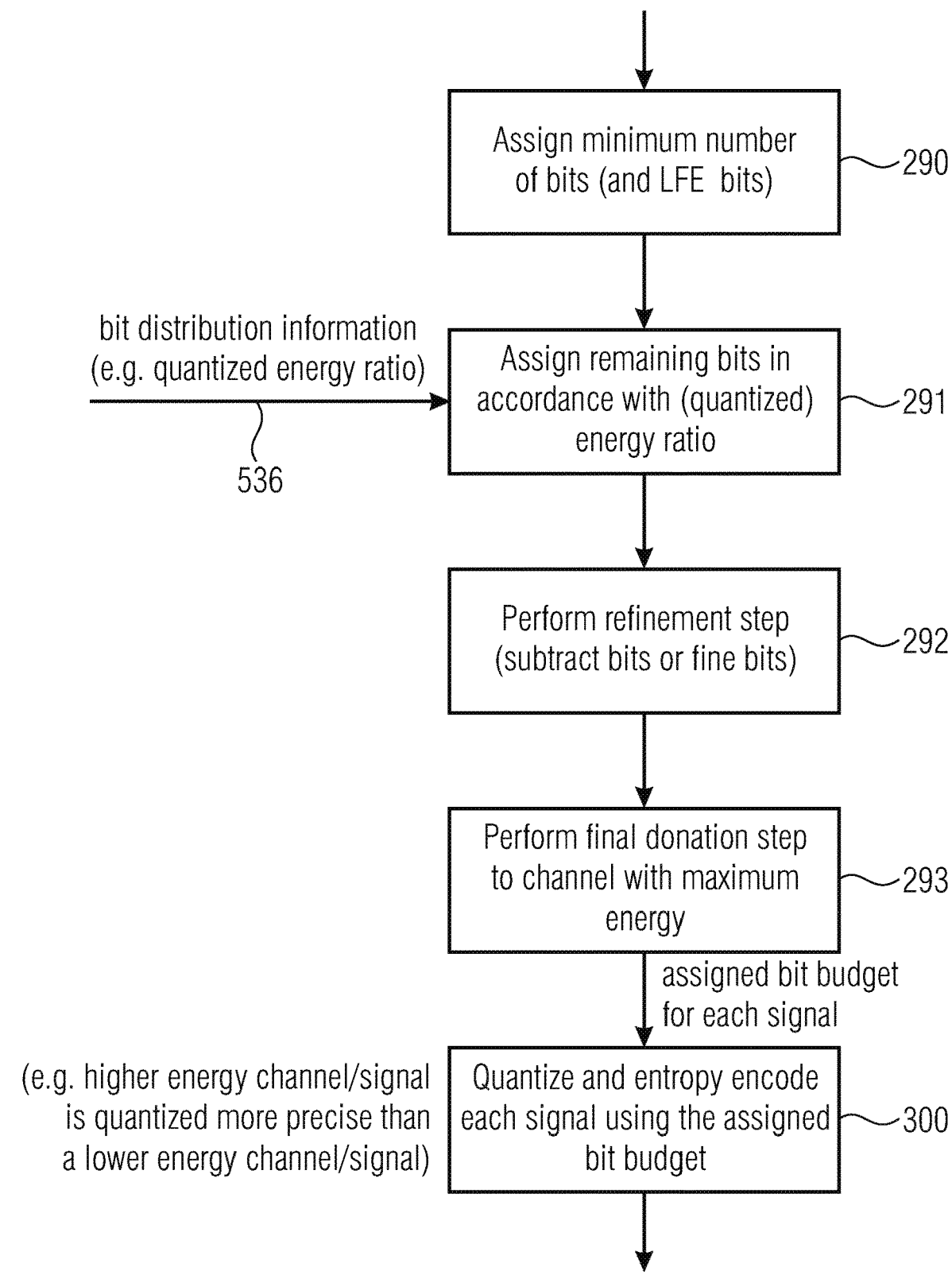
FIG. 9 illustrates another procedure for the purpose of performing bit allocation to be used by the quantization encoding processor of FIG. 5.

The actual bit allocation is performed in an embodiment based on the procedures illustrated in FIG. 9. In a first procedure, a minimum number of bits for non-LFE (low frequency enhancement) channels are assigned, and, if available, low frequency enhancement channel bits. These minimum numbers of bits are needed by the signal encoder 300 irrespective of a certain signal content. The remaining bits are assigned in accordance with the bit distribution information 536 generated by block 286 of FIG. 8 and input into block 291. The assignment is done based on the quantized energy ratio and it is advantageous to use the quantized energy ratio rather than an non-quantized energy.

In step 292, a refinement is performed. When the quantization was so that the remaining bits are assigned and the result is higher than the available number of bits, a subtraction of bits assigned in block 291 has to be performed. When, however, the quantization of the energy ratio was so that the assignment procedure in block 291 is so that there are still bits to be further assigned, these bits can be additionally given or distributed in the refinement step 292. If, subsequent to the refinement step, there still exist any bits to use by the signal encoder, a final donation step 293 is performed, and the final donation is done to the channel with the maximum energy. At the output of step 293, the assigned bit budget for each signal is available.

In step 300, the quantization and entropy encoding of each signal using the assigned bit budget generated by the process of steps 290, 291, 292, 293 is performed. Basically, the bit allocation is performed in such a way that a higher energy channel/signal is quantized more precise than a lower energy channel/signal. Importantly the bit allocation is not done using the original signals or the whitened signals but is done using the signals at the output of the adaptive joint signal processor 200 that have different energies than the signals input into the adaptive joint signal processing due to the joint channel processing. In this context, it is also to be noted that, although a channel pair processing is the advantageous implementation, other groups of channels can be selected and processed by means of the cross correlation. For example, groups of three or even four channels can be formed by means of the adaptive joint signal processor and correspondingly processed in a cascaded full procedure or a cascaded procedure with a simplified tree or within a non-cascaded procedure.

Figure 10:
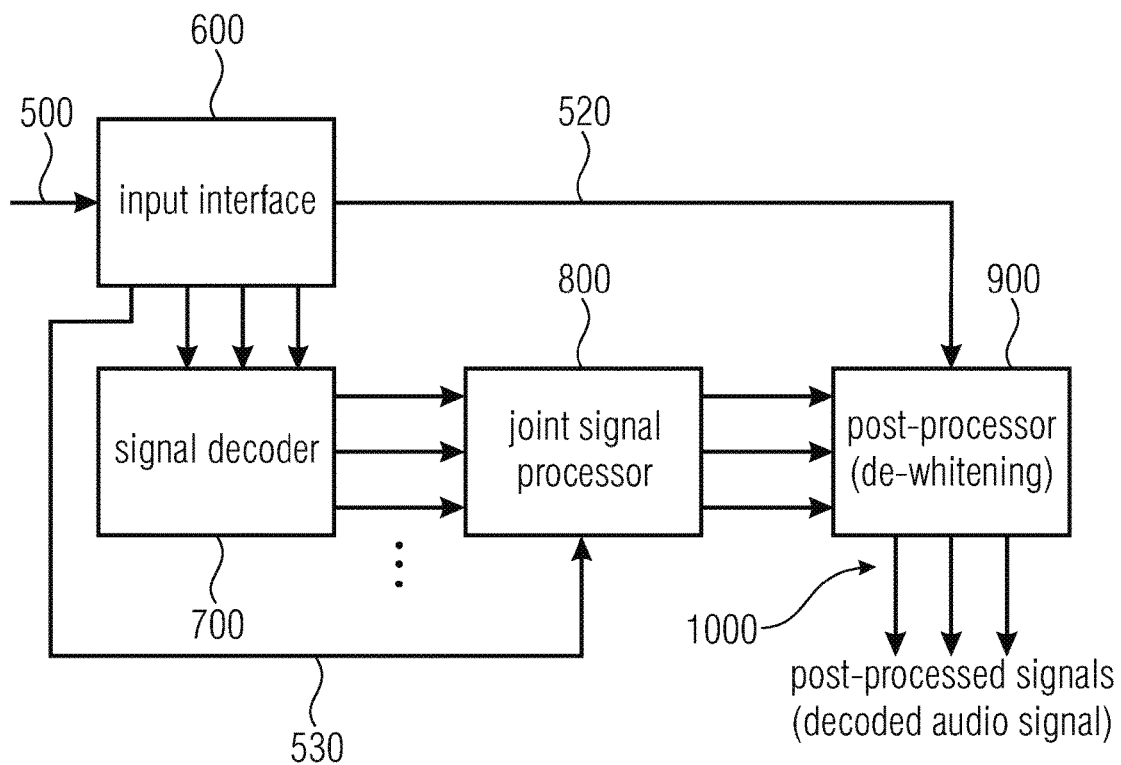
FIG. 10 illustrates a block diagram of an implementation of the multi-signal decoder.
Figure 11:
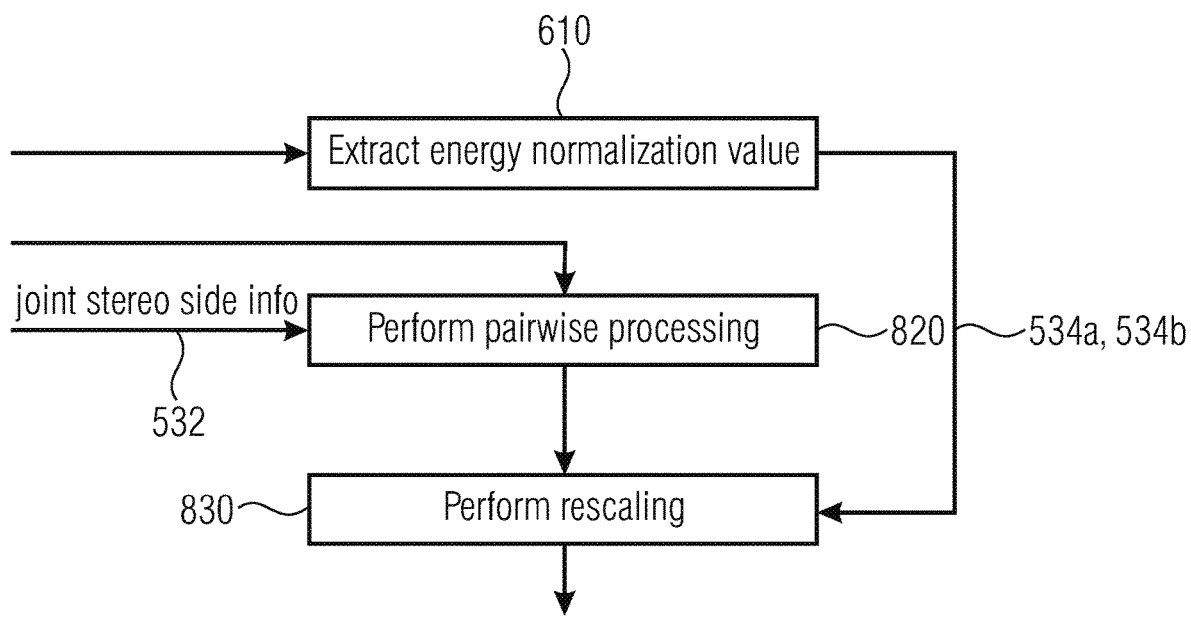
FIG. 11 illustrates an implementation performed by the joint signal processor of FIG. 10.

The bit allocation illustrated in blocks 290, 291, 292, 293 is performed in the same way on the decoder-side by means of the signal decoder 700 of FIG. 10 using the distribution information 536 as extracted from the encoded multi-signal audio signal 500.

Preferred Embodiments

In this implementation, the codec uses new concepts to merge the flexibility of signal adaptive joint coding of arbitrary channels as described in [6] by introducing the concepts described in [7] for joint stereo coding. These are:
a) Use of perceptually whitened signals for further coding (similar to the way they are used in a speech coder). This has several advantages:
  Simplification of the codec architecture
  Compact representation of the noise shaping characteristics/masking threshold (e.g. as LPC coefficients)
  Unifies transform and speech codec architecture and thus enables combined audio/speech coding
b) Use of a ILD parameters of arbitrary channels to efficiently code panned sources
c) Flexible bit distribution among the processed channels based on the energy.

The codec uses Frequency Domain Noise Shaping (FDNS) to perceptually whiten the signal with the rate-loop as described in [8] combined with the spectral envelope warping as described in [9]. The codec further normalized the FDNS-whitened spectrum towards the mean energy level using ILD parameters. Channel pairs for joint coding are selected in an adaptive manner as described in [6], where the stereo coding consist of a band-wise M/S vs L/R decision. The band-wise M/S decision is based on the estimated bitrate in each band when coded in the L/R and in the M/S mode as described in [7]. Bitrate distribution among the band-wise M/S processed channels is based on the energy.

Embodiments relate to an MDCT-based multi-signal encoding and decoding system with signal-adaptive joint channel processing, wherein the signal can be a channel, and the multisignal is a multichannel signal or, alternatively an audio signal being a component of a sound field description such as an Ambisonics component, i.e., W, X, Y, Z in first order Ambisonics or any other component in a higher order Ambisonics description. The signal can also be a signal of an A-format or B-format or any other format description of a sound field. Hence, the same disclosure given for "channels" is also valid for "components" or other "signals" of the multisignal audio signal.

Encoder Single Channel Processing Up to Whitened Spectrum

Each single channel k is analyzed and transformed to a whitened MDCT-domain spectrum following the processing steps as shown in the block diagram of FIG. 1.

The processing blocks of the time-domain Transient Detector, Windowing, MDCT, MDST and OLA are described in [8]. MDCT and MDST form Modulated Complex Lapped Transform (MCLT); performing separately MDCT and MDST is equivalent to performing MCLT; "MCLT to MDCT" represents taking just the MDCT part of the MCLT and discarding MDST.

Temporal Noise Shaping (TNS) is done similar as described in [8] with the addition that the order of the TNS and the Frequency domain noise shaping (FDNS) is adaptive. The existence of the 2 TNS boxes in the figures is to be understood as the possibility to change the order of the FDNS and the TNS. The decision of the order of the TNS and the FDNS can be for example the one described in [9].

Frequency domain noise shaping (FDNS) and the calculation of FDNS parameters are similar to the procedure described in [9]. One difference is that the FDNS parameters for frames where TNS is inactive are calculated from the MCLT spectrum. In frames where the TNS is active, the MDST spectrum is estimated from the MDCT spectrum.

FIG. 1 illustrates an implementation of the signal processor 100 that performs the whitening of the at least three audio signals to obtain individually preprocessed whitened signals 180. The signal preprocessor 100 comprises an input for the time domain input signal of a channel k. This signal is input into a windower 102, a transient detector 104 and an LTP parameter calculator 106. The transient detector 104 detects, whether a current portion of the input signal is transient and in case this is confirmed, the transient detector 104 controls the windower 102 to set a smaller window length. The window indication, i.e., which window length has been chosen is also included into the side information and, particularly, into the preprocessing side information 520 of FIG. 5b. Additionally, the LTP parameters calculated by block 106 are also introduced into the side information block, and these LTP parameters can, for example, be used to perform some kind of post processing of decoded signals or other procedures known in the art. The windower 140 generates windowed time domain frames that are introduced into a time-to-spectral converter 108. The time-to-spectral converter 108 advantageously performs a complex lapped transform. From this complex lapped transform, the real part can be derived to obtain the result of an MDCT transform as indicated in block 112. The result of block 112, i.e., an MDCT spectrum is input into a TNS block 114a and a subsequently connected FDNS block 116. Alternatively, only the FDNS is performed without the TNS block 114a or vice versa or the TNS processing is performed subsequent to the FDNS processing, as indicated by block 114b. Typically, either block 114a or block 114b is present. At the output of block 114b, when block 114a is not present or at the output of block 116 when block 114b is not present, the whitened individually processed signals, i.e., the preprocessed signals are obtained for each channel k. The TNS block 114a or 114b and the FDNS block 116 generate and forward preprocessing information into the side information 520.

It is not necessary in any case to have a complex transform within block 108. Additionally, a time-to-spectral converter only performing an MDCT is also sufficient for certain applications and, if an imaginary part of the transform is required, this imaginary part can also be estimated from the real part, as the case may be. A feature of the TNS/FDNS processing is that, in case of TNS being inactive, the FDNS parameters are calculated from the complex spectrum, i.e., from the MCLT spectrum while, in frames, where TNS is active, the MDST spectrum is estimated from the MDCT spectrum so that one has, for the frequency domain noise shaping operation, the full complex spectrum available.

Joint Channel Encoding System Description

In the described system, after each channel is transformed to the whitened MDCT domain, signal-adaptive exploitation of varying similarities between arbitrary channels for joint coding is applied, based on the algorithm described in [6]. From this procedure, the respective channel-pairs are detected and chosen to be jointly coded using a band-wise M/S transform.

Figure 2:
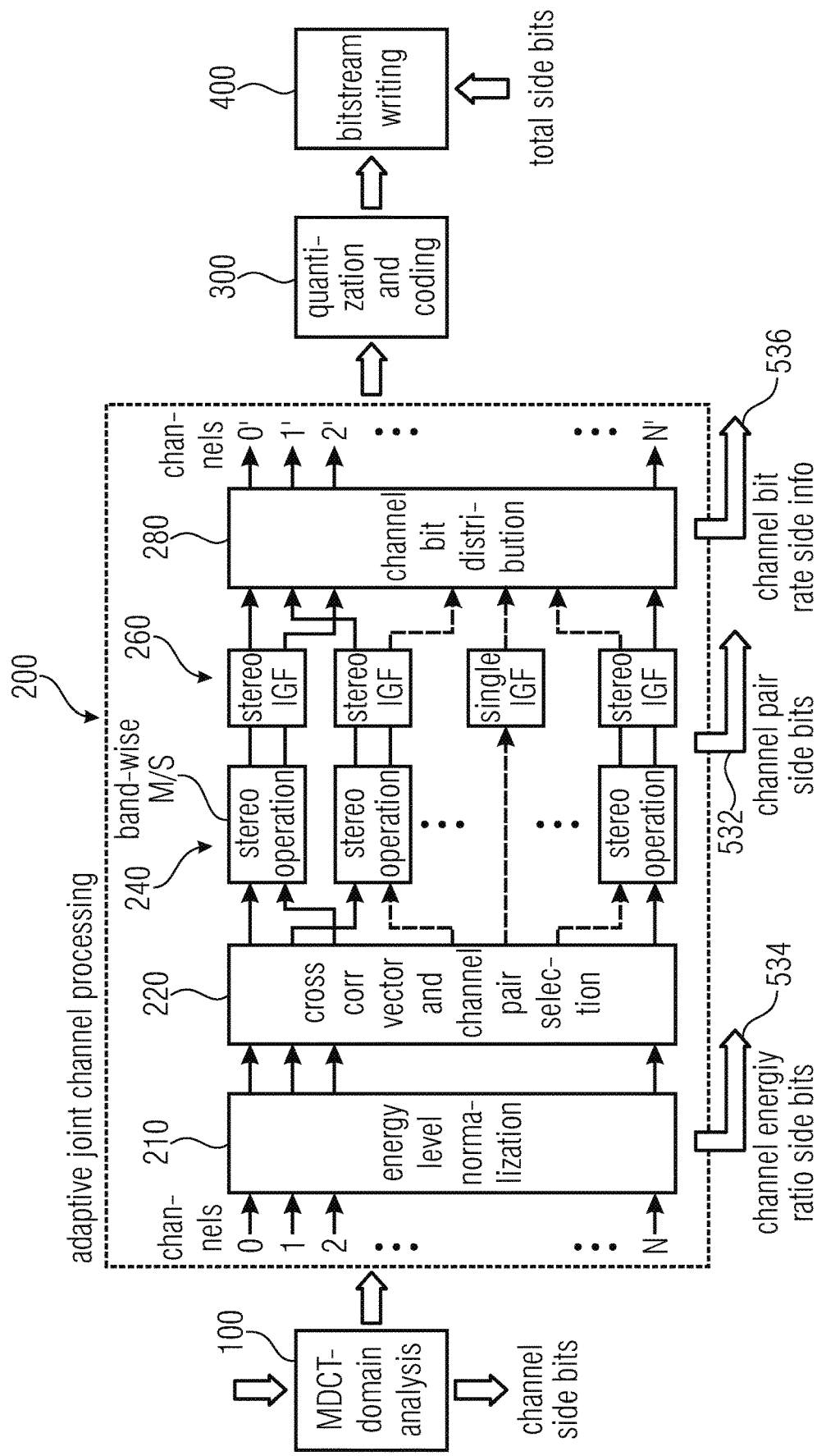
FIG. 2 illustrates an implementation of a block diagram of the multi-signal encoder.

An overview of the encoding system is given in FIG. 2. For simplicity block arrows represent single channel processing (i.e. the processing block is applied to each channel) and block "MDCT-domain analysis" is represented in detail in FIG. 1.

In the following paragraphs, the individual steps of the algorithm applied per frame are described in detail. A data flow graph of the algorithm described is given in FIG. 3.

It should be noted, in the initial configuration of the system, there is a channel mask indicating for which channels the multi-channel joint coding tool is active. Therefore, for input where LFE (Low-Frequency Effects/Enhancement) channels are present, they are not taken into account in the processing steps of the tool.

Energy Normalization of all Channels Towards Mean Energy

An M/S transform is not efficient if ILD exists, that is if channels are panned. We avoid this problem by normalizing the amplitude of the perceptually whitened spectra of all channels to a mean energy level $\overline{E}$.

Calculate energy Ex for each channel $k=0, \ldots, C_{total}$ $$E_k = \sqrt{\sum_{i=0}^{N} X_{mdct}(i)^2}$$

where N is the total number of spectral coefficients.
calculate mean energy $$\overline{E} = \frac{\sum_{k=0}^{C_{total}} E_k}{C_{total}}$$

normalize the spectrum of each channel towards mean energy if $E_k > \overline{E}$ (downscaling)

$$a_k = \frac{\overline{E}}{E_k}$$

where a is the scaling ratio. The scaling ratio is uniformly quantized and sent to the decoder as side information bits.

$\widehat{ILD}(k) = \max(1, \min(\text{ILD}_{RANGE}-1, \lfloor (\text{ILD}_{RANGE} * a_k + 0.5) \rfloor))$ where $\text{ILD}_{RANGE} = 1 << \text{ILD}_{bits}$ Then the quantized scaling ratio with which the spectrum is finally scaled is given by $$a_q(k) = \frac{\widehat{ILD}(k)}{ILD_{RANGE}}$$

if $E_k < \overline{E}$ (upscaling)

$$a_k = \frac{E_k}{\overline{E}}$$

and $$a_q(k) = \frac{IDL_{RANGE}}{\widehat{ILD}(k)}$$

where $\widehat{ILD}(k)$ is calculated as in previous case.

To distinguish whether we have downscaling/upscaling at decoder and in order to revert the normalization, besides the $\widehat{ILD}$ values for each channel, a 1-bit flag (0=downscaling/1=upscaling) is sent. $\text{ILD}_{RANGE}$ indicates the number of bits used for the transmitted quantized scaling value $\widehat{ILD}$, and this value is known to the encoder and the decoder and does not have to be transmitted in the encoded audio signal.

Calculation of Normalized Inter-Channel Cross-Correlation Values for all Possible Channel-Pairs In this step, in order to decide and select which channel pair has the highest degree of similarities and therefore is suitable to be selected as a pair for stereo joint coding, the inter-channel normalized cross-correlation value for each possible channel pair is calculated. The normalized cross-correlation value for each channel pair is given by the cross-spectrum as follows:

$$\tilde{r}_{XY} = \frac{r_{XY}}{\sqrt{r_{XX} r_{YY}}}$$

where $$r_{XY} = \sum_{i=0}^{N} X_{MDCT}(i) * Y_{MDCT}(i)$$

N being the total number of spectral coefficients per frame $X_{MDCT}$ and $Y_{MDCT}$ being the respective spectra of the channel-pair under consideration.

The normalized cross-correlation values for each channel paired are stored in the cross-correlation vector $CC = [\tilde{r}_0, \tilde{r}_1, \ldots, \tilde{r}_P]$ where $P = (C_{total} * (C_{total}-1))/2$ is the maximum number of possible pairs.

As seen in FIG. 1, depending on the transient detector we can have different block sizes (e.g. 10 or 20 ms window block sizes). Therefore, the inter-channel cross-correlation is calculated given that the spectral resolution for both channels is the same. If otherwise, then the value is set to 0, thus ensuring that no such channel pair is selected for joint coding.

An indexing scheme to uniquely represent each channel pair is used. An example of such a scheme for indexing six input channels is shown in FIG. 4.

The same indexing scheme is held throughout the algorithm at is used also to signal channel pairs to the decoder. The number of bits needed for signaling one channel-pair amount to $\text{bits}_{idx} = \lfloor \log_2(P-1) \rfloor + 1$ Channel-Pair Selection and Jointly Coded Stereo Processing After calculating the cross-correlation vector, the first channel-pair to be considered for joint-coding is the respective with the highest cross-correlation value and higher than a minimum value threshold advantageously of 0.3.

The selected pair of channels serve as input to a stereo encoding procedure, namely a bandwise M/S transform. For each spectral band, the decision whether the channels will be coded using M/S or discrete L/R coding depends on the estimated bitrate for each case. The coding method that is less demanding in terms of bits is selected. This procedure is described in detail in [7].

The output of this process results to an updated spectrum for each of the channels of the selected channel-pair. Also, information that need to be shared with the decoder (side information) regarding this channel-pair are created, i.e. which stereo mode is selected (Full M/S, dual-mono, or band-wise M/S) and if band-wise M/S is the mode selected the respective mask of indicating whether M/S coding is chosen (1) or L/R (0).

For the next steps there are two variations of the algorithm:

Cascaded Channel—Pair Tree

For this variation, the cross-correlation vector is updated for the channel pairs that are affected from the altered spectrum (if we have M/S transform) of the selected channel-pair. For example, in the case with 6 channels, if the selected and processed channel pair was the one indexed 0 of FIG. 4, meaning the coding of channel 0 with channel 1, than after the stereo processing we would need to re-calculate the cross-correlation for the channel pairs affected, i.e. with index 0,1,2,3,4,5,6,7,8.

Then, the procedure continues as previously described: select channel-pair with maximum cross-correlation, confirm that it is above a minimum threshold and apply stereo operation. This means that channels that were part of a previous channel-pair may be re-selected to serve as input to a new channel-pair, the term "cascaded". This may happen as remaining correlation may still be present between the output of a channel-pair and another arbitrary channel representing a different direction in the spatial domain. Of course, no same channel-pair should be selected twice.

The procedure continues when the maximum allowed number of iterations (absolute maximum is P) are reached or after updating the cross-correlation vector no channel-pair value surpassed the threshold of 0.3 (there is no correlation between the arbitrary channels).

Simplified Tree

The cascaded channel-pair tree process is theoretically optimal as it attempts to remove correlation of all arbitrary channels and provide maximum energy compaction. On the other hand, it is rather complex as the number of channel pairs selected can be more than $$\frac{C_{tot}}{2}$$

resulting in additional computational complexity (coming from the M/S decision process of the stereo operation) and also additional metadata that needs to be transmitted to the decoder for each channel pair.

For the simplified tree variation, there is no "cascading" allowed. That is ensured, when from the process described above, while updating the cross-correlation vector, the values of the affected channel-pairs of a previous channel-pair stereo operation, are not re-calculated but set to 0. Therefore, it is not possible to select a channel-pair for which one of the channels was already part of an existing channel pair.

This is the variation describing the "adaptive joint channel processing" block in FIG. 2.

This case results in similar complexity with a system with pre-defined channel-pairs (e.g. L and R, rear L and rear R) as the maximum channel-pairs that can be selected is $$\frac{C_{tot}}{2}.$$

It should be noted, that there may be cases where the stereo operation of a selected channel-pair does not alter the spectra of the channels. That happens when the M/S decision algorithm decides the coding mode should be "dual-mono". In this case, the arbitrary channels involved are not considered a channel-pair anymore as they will be coded separately. Also, updating the cross-correlation vector will have no effect. To continue with the process, the channel-pair with the next highest value is considered. The steps in this case continue as described above.

Retain Channel Pair Selection (Stereo Tree) of Previous Frame

In many cases the normalized cross-correlation values of arbitrary channel-pairs from frame to frame can be close and therefore the selection can switch often between this close values.

That may cause frequent channel-pair tree switching, which may result to audible instabilities to the output system. Therefore, it is opted to use a stabilization mechanism, where a new set of channel pairs is selected only when there is a significant change to the signal and the similarities between arbitrary channels change. To detect this, the cross-correlation vector of the current frame with the vector of the previous frame is compared and when the difference is larger than a certain threshold then the selection of new channel pairs is allowed.

The variation in time of the cross-correlation vector is calculated as follows:

$$CC_{diff} = \sum_{i=0}^{P} |CC[i] - CC_{prev}[i]|$$

If $C_{diff} > t$, then the selection of new channel-pairs to be jointly coded, as described in the previous step, is allowed. A threshold chosen is given by $$t = 0.15 C_{tot}(C_{tot}-1)/2$$

If, on the other hand, the differences are small, then the same channel-pair tree as in the previous frame is used. For each given channel-pair, the band-wise M/S operation is applied as previously described. If, however, the normalized cross-correlation value of the given channel-pair does not exceed the threshold of 0.3 then the selection of new channel pairs creating a new tree is initiated.

Revert Energy of Single Channels

After the termination of the iteration process for the channel pair selection there may be channels that are not part of any channel/pair and therefore are coded separately. For those channels the initial normalization of the energy level towards the mean energy level is reverted back to their original energy level. Depending on the flag signaling upscaling or downscaling the energy of these channels are reverted using the inverse of the quantized scaling ratio $$\frac{1}{a_q(k)}.$$

IGF for Multi-Channel Processing

Regarding IGF analysis, in case of stereo channel pairs an additional joint stereo processing is applied, as is thoroughly described in [10]. This is necessary, because for a certain destination range in the IGF spectrum the signal can be a highly correlated panned sound source. In case the source regions chosen for this particular region are not well correlated, although the energies are matched for the destination regions, the spatial image can suffer due to the uncorrelated source regions.

Therefore, for each channel pair stereo IGF is applied if the stereo mode of the core region is different to the stereo mode of the IGF region or if the stereo mode of the core is flagged as band-wise M/S. If these conditions do not apply, then single channel IGF analysis is performed. If there are single channels, not coded jointly in a channel-pair, then they also undergo a single channel IGF analysis.

Distribution of Available Bits for Encoding the Spectrum of Each Channel

After the process of joint channel-pair stereo processing, each channel is quantized and coded separately by an entropy coder. Therefore, for each channel the available number of bits should be given. In this step, the total available bits are distributed to each channel using the energies of the processed channels.

The energy of each channel, the calculation of which is described above in the normalization step, is recalculated as the spectrum for each channel may have changed due to the joint processing. The new energies are denoted $\tilde{E}_k$, $k=0, 1, \ldots, C_{tot}$. As a first step the energy-based ratio with which the bits will be distributed is calculated:

$$rt_k = \frac{\tilde{E}_k}{\sum_{k=0}^{C_{tot}} \tilde{E}_k}$$

Here it should be noted, that in the case where the input consists also from an LFE channel, it is not taken into account for the ratio calculations. For the LFE channel, a minimal amount of bits $bits_{LFE}$ is assigned only if the channel has non-zero content. The ratio is uniformly quantized:

$$\hat{rt}_k = \max(1, \min(rt_{RANGE}-1, \lfloor rt_{RANGE} \cdot rt_k + 0.5 \rfloor))$$

$$rt_{RANGE} = 1 << rt_{bits}$$

The quantized ratios $\hat{r}_k$ are stored in the bitstream to be used from the decoder to assign the same amount of bits to each channel to read the transmitted channel spectra coefficients.

The bit distribution scheme is described below:

For each channel assign the minimum amount of bits needed by the entropy coder $bits_{min}$ The remaining bits, i.e. $bits_{remaining} = bits_{total} - \sum_{k=0}^{C_{tot}} bits_{min,k} - bits_{LFE}$ are divided using the quantized ratio $\hat{rt}_k$:

$$bits_k = \frac{\hat{rt}_k}{rt_{RANGE}} \cdot bits_{remaining}$$

Because of the quantized ratio the bits are approximately distributed and therefore it may be $bits_{split} = \sum_{k=0}^{C_{tot}} bits_k \neq bits_{total}$. So in a second refining step the difference $bits_{diff} = bits_{split} - bits_{total}$ are proportionally subtracted from the channel bits $bits_k$ $$bits_k = bits_k - \frac{\hat{rt}_k}{rt_{RANGE}} \cdot bits_{diff}$$

After the refinement step if there is still a discrepancy of $bits_{split}$ in comparison with $bits_{total}$ the difference (usually very few bits) is donated to the channel with the maximum energy.

The exact same procedure is followed from the decoder in order to determine the amount of bits to be read to decode the spectrum coefficients of each channel. $rt_{RANGE}$ indicates the number of bits used for the bit distribution information $bits_k$ and this value is known to the encoder and the decoder and does not have to be transmitted in the encoded audio signal.

Quantization and Coding of Each Channel

Quantization, noise filling and the entropy encoding, including the rate-loop, are as described in [8]. The rate-loop can be optimized using the estimated $G_{est}$. The power spectrum P (magnitude of the MCLT) is used for the tonality/noise measures in the quantization and Intelligent Gap Filling (IGF) as described in [8]. Since whitened and band-wise M/S processed MDCT spectrum is used for the power spectrum, the same FDNS and M/S processing has to be done on the MDST spectrum. The same normalization scaling based on the ILD has to be done for the MDST spectrum as it was done for the MDCT. For the frames where TNS is active, MDST spectrum used for the power spectrum calculation is estimated from the whitened and M/S processed MDCT spectrum.

FIG. 2 illustrates a block diagram of an implementation of the encoder and, particularly, the adaptive joint signal processor 200 of FIG. 2. All the at least three preprocessed audio signals 180 are input into an energy normalization block 210 which generates, at its output, the channel energy ratio side bits 534 consisting of, on the one hand, the quantized ratios and on the other hand the flags for each channel indicating an upscaling or a down scaling. However, other procedures without explicit flags for upscaling or downscaling can be performed as well.

The normalized channels are input into a block 220 for performing a cross correlation vector calculation and channel pair selection. Based on the procedure in block 220 which is advantageously an iterative procedure using a cascaded full tree or a cascaded simplified tree processing or which is, alternatively, a non-iterative non-cascaded processing, the corresponding stereo operations are performed in block 240 that may perform a full band or a band-wise mid/side processing or any other corresponding stereo processing operation such as rotations, scalings, any weighted or non-weighted linear or non-linear combinations, etc.

At the output of the blocks 240, a stereo intelligent gap filling (IGF) processing or any other bandwidth extension processing such as spectral band replication processing or harmonic bandwidth processing can be performed. The processing of the individual channel pairs is signaled via channel pair side information bits and, although not illustrated in FIG. 2, IGF or general bandwidth extension parameters generated by the blocks 260 are also written into the bit stream for the joint processing side information 530 and, particularly, for the pairwise processing side information 532 of FIG. 5b.

The final stage of FIG. 2 is the channel bit distribution processor 280 that calculates the bit allocation ratio as has, for example, been explained with respect to FIG. 9. FIG. 2 illustrates a schematic representation of the signal encoder 300 as a quantizer and coder being controlled by the channel bitrate side information 530 and, additionally, the output interface 400 or bitstream writer 400 that combines the result of the signals encoder 300 and all the required side information bits 520, 530 of FIG. 5b.

Figure 3:
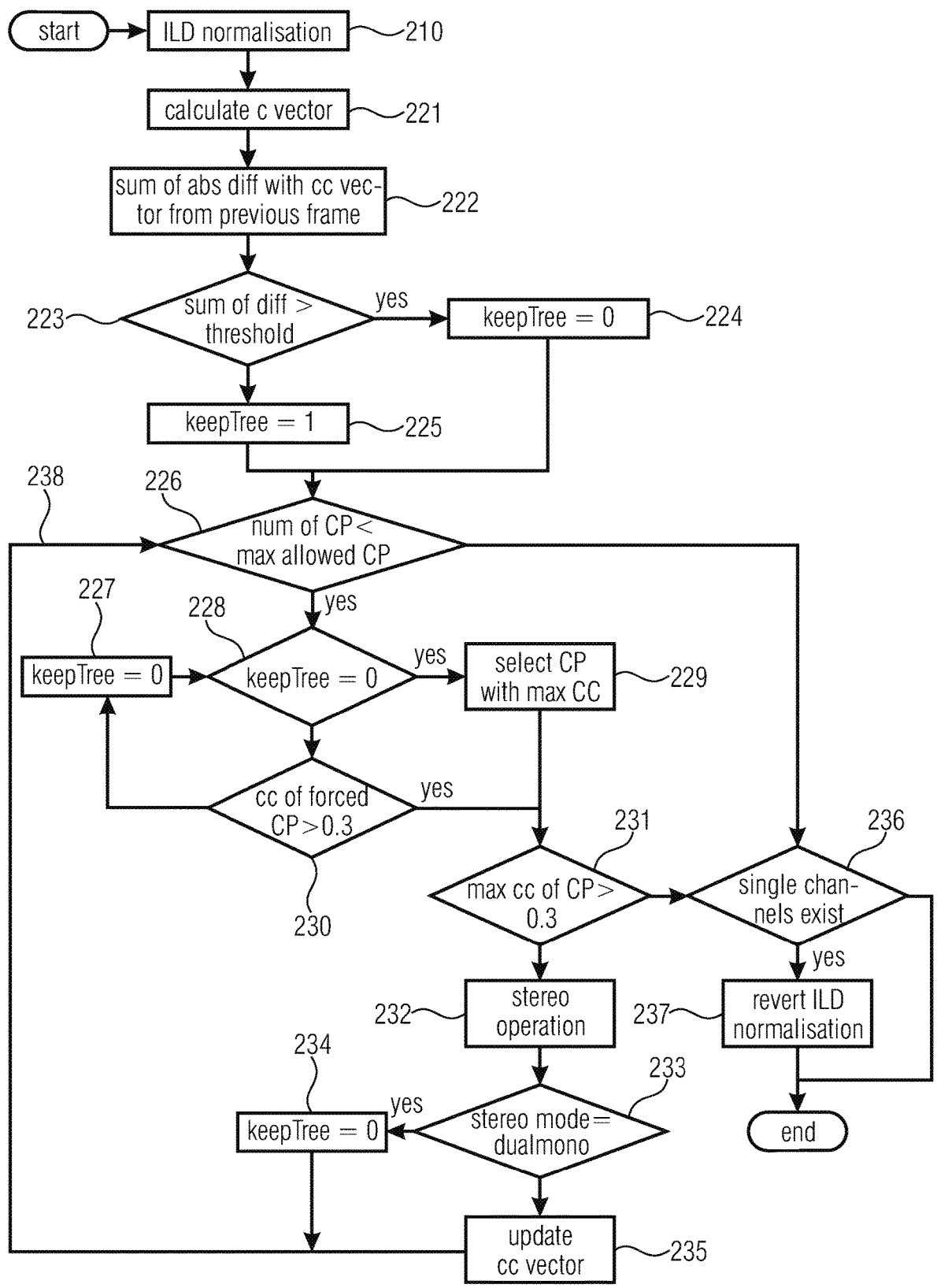
FIG. 3 illustrates the advantageous implementation of the cross-correlation vector and channel pair selection procedure of FIG. 2.

FIG. 3 illustrates an implementation of substantial procedures performed by blocks 210, 220, 240. Subsequent to a start of the procedure, an ILD normalization is performed as indicated at 210 in FIG. 2 or FIG. 3. In step 221, the cross-correlation vector is calculated. The cross-correlation vector consists of normalized cross-correlation values for each possible channel pair of the channels from 0 to N output by block 210. For the example in FIG. 4 where there are six channels 15 different possibilities that go from 0 to 14 can be examined. The first element of the cross-correlation vector has the cross-correlation value between channel 0 and channel 1 and, for example, the element of the cross-correlation vector with the index 11 has the cross-correlation between channel 2 and channel 5.

In step 222, the calculation is performed in order to determine whether the tree as determined for the preceding frame is to be maintained or not. To this end, the variation in time of the cross-correlation vector is calculated and, Advantageously, the sum of the individual differences of the cross-correlation vectors and, particularly, the magnitudes of the differences is calculated. In step 223, it is determined whether the sum of the differences is greater than the threshold. If this is the case, then, in step 224, the flag keepTree is set to 0, which means that the tree is not kept, but a new tree is calculated. When, however, it is determined that the sum is smaller than the threshold, block 225 sets the flag keepTree=1 so that the tree is determined from the previous frame is also applied for the current frame.

In step 226, the iteration termination criterion is checked. In case it is determined that the maximum number of channel pairs (CP) is not reached, which is, of course, the case when block 226 is accessed for the first time, and when the flag keepTree is set to 0 as determined by block 228, the procedure goes on with block 229 for the selection of the channel pair with the maximum cross-correlation from the cross-correlation vector. When, however, the tree of the earlier frame is maintained, i.e., when keepTree is equal to 1 as has been checked in block 225, block 230 determines whether the cross-correlation of the "forced" channel pair is greater than the threshold. If this is not the case, the procedure is continued with step 227, which means, nevertheless, that a new tree is to be determined although the procedure in block 223 determined the opposite. The evaluation in block 230 and the corresponding consequence in block 227 can overturn the determination in block 223 and 225.

In block 231, it is determined whether the channel pair with the maximum cross-correlation is above 0.3. If this is the case, the stereo operation in block 232 is performed, which is also indicated as 240 in FIG. 2. When in block 233, it is determined that the stereo operation was dual mono, the value keepTree equal to 0 is set in block 234. When, however, it is determined that the stereo mode was different from dual mono, the cross-correlation vector 235 has to be recalculated, since a mid/side operation has been performed and the output of a stereo operation block 240 (or 232) is different due to the processing. An update of the CC vector 235 is only necessary when there has actually been a mid/side stereo operation or, generally, a stereo operation different from dual mono.

When, however, the check in block 226 or the check in block 231 results in a "no" answer, the control goes to block 236 in order to check whether a single channel exists. If this is the case, i.e., if a single channel has been found that has not been processed together with another channel in a channel-pair processing, the ILD normalization is reversed in block 237. Alternatively, the reversal in block 237 can only be a part reversal or can be some kind of weighting.

In case the iteration is completed and in case blocks 236 and 237 are completed as well, the procedure ends and all channel pairs have been processed and, at the output of the adaptive joint signal processor, there are at least three jointly processed signals in case of block 236 resulting in a "no" answer, or there are at least two jointly processed signals and an unprocessed signal corresponding to a "single channel", when block 236 has resulted in a "yes" answer.

Decoding System Description

The decoding process starts with decoding and inverse quantization of the spectrum of the jointly coded channels, followed by the noise filling as described in 6.2.2 "MDCT based TCX" in [11] or [12]. The number of bits allocated to each channel is determined based on the window length, the stereo mode and the bitrate ratio $\hat{rt}_k$ that are coded in the bitstream. The number of bits allocated to each channel has to be known before fully decoding the bitstream.

In the intelligent gap filling (IGF) block, lines quantized to zero in a certain range of the spectrum, called the target tile are filled with processed content from a different range of the spectrum, called the source tile. Due to the band-wise stereo processing, the stereo representation (i.e. either L/R or M/S) might differ for the source and the target tile. To ensure good quality, if the representation of the source tile is different from the representation of the target tile, the source tile is processed to transform it to the representation of the target file prior to the gap filling in the decoder. This procedure is already described in [10]. The IGF itself is, contrary to [11] and [12], applied in the whitened spectral domain instead of the original spectral domain. In contrast to the known stereo codecs (e.g. [10]), the IGF is applied in the whitened, ILD compensated spectral domain.

From the bitstream signaling it is also known if there are channel-pairs that were jointly coded. The inverse processing should start with the last channel-pair formed in the encoder, especially for the cascaded channel pair-tree, in order to convert back to the original whitened spectra of each channel. For each channel pair the inverse stereo processing is applied based on the stereo mode and the band-wise M/S decision.

For all channels that were involved in channel pairs and were jointly coded, the spectrum is de-normalized to the original energy level based on the $\widehat{ILD}$ (k) values that were sent from the encoder.

FIG. 10 illustrates an implementation of a multi-signal decoder for decoding an encoded signal 500. The multi-signal decoder comprises an input interface 600, a signal decoder 700 for decoding at least three encoded signals output by the input interface 600. The multi-signal decoder comprises a joint signal processor 800 for performing a joint signal processing in accordance with side information included in the encoded signal to obtain at least three processed decoded signals. The multi-signal decoder comprises a post-processor 900 for postprocessing the at least three processed decoded signals in accordance with side information included in the encoded signal. Particularly the post-processing is performed in such a way that the post-processed signals are less white than the signals before post-processing. The post-processed signals represent, either directly or indirectly, the decoded audio signal 1000.

The side information extracted by the input interface 600 and forwarded to the joint signal processor 800 is the side information 530 illustrated in FIG. 5b, and the side information extracted by the input interface 600 from the encoded multi-signal audio signal that is forwarded to the post-processor 900 for performing the de-whitening operation is the side information 520 illustrated and explained with respect to FIG. 5b.

The joint signal processor 800 is configured to extract or to receive from the input interface 600 an energy normalization value for each joint stereo decoded signal. This energy normalization value for each joint stereo decoded signal corresponds to the energy scaling information 530 of FIG. 5b. The adaptive joint signal processor 200 is configured to pair-wise process 820 the decoded signals using a joint stereo side information or a joint stereo mode as indicated by the joint stereo side information 532 included in the encoded audio signal 500 to obtain the joint stereo decoded signals at the output of block 820. In block 830, a rescaling operation and, particularly an energy rescaling of the joint stereo decoded signals is performed using the energy normalization values to obtain the processed decoded signals at the output of block 800 of FIG. 10.

In order to make sure that a channel that has received a reverse ILD normalization as explained with respect to FIG. 3 in block 237, the joint signal processor 800 is configured to check whether an energy normalization value extracted from the encoded signal for a specific signal has a predefined value. If this is the case, an energy rescaling is not performed or only a reduced energy rescaling to the specific signal is performed, or any other weighting operation to this individual channel is performed when the energy normalization value has this predefined value.

Figure 12:
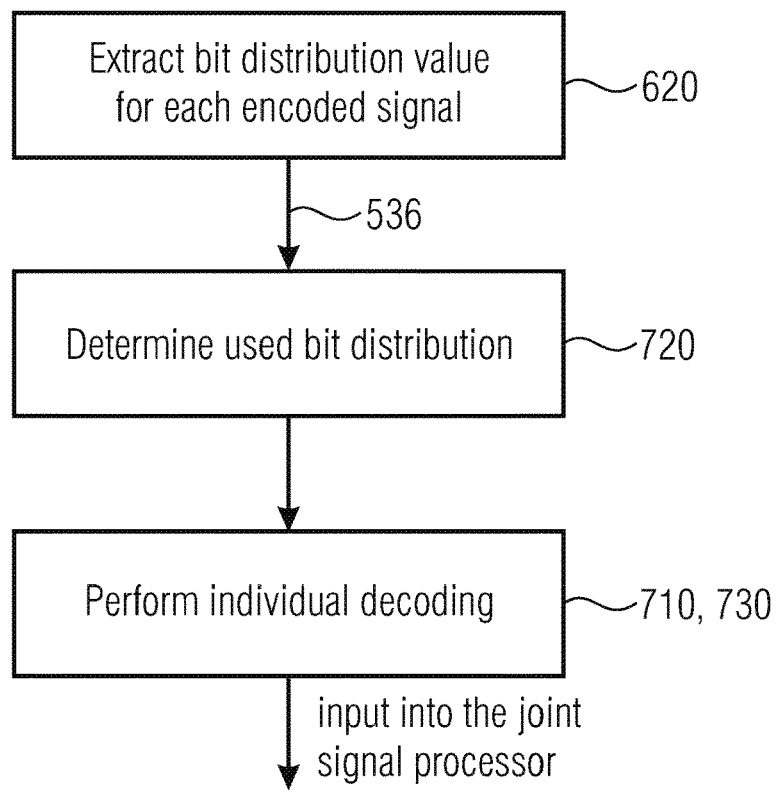
FIG. 12 illustrates an implementation of the signal decoder of FIG. 10.
Figure 13:
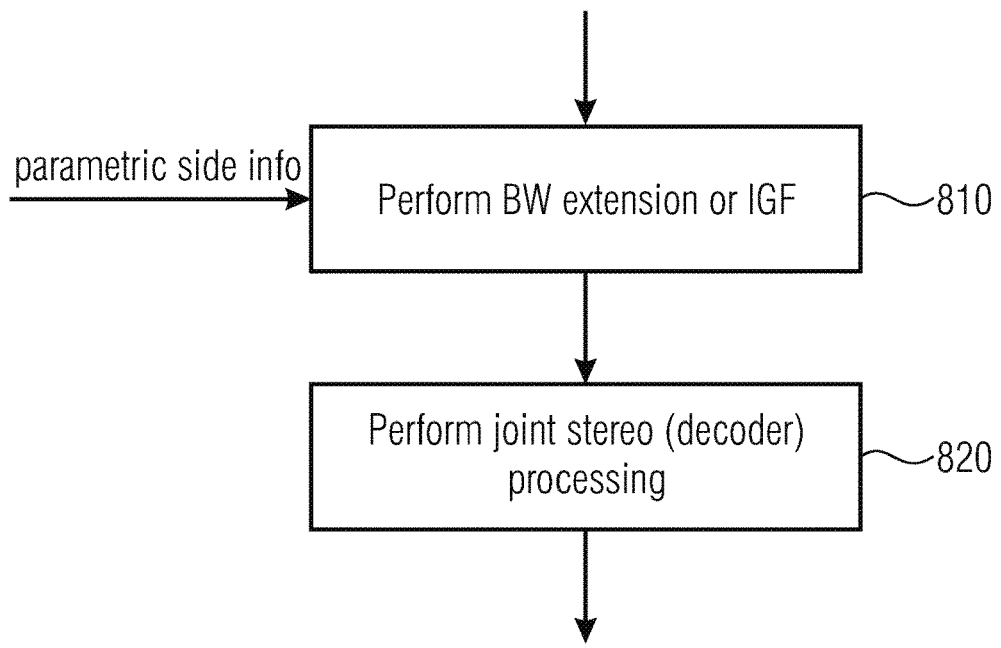
FIG. 13 illustrates another advantageous implementation of the joint signal processor in the context of bandwidth extension or intelligent gap filling (IGF)

In an embodiment, the signal decoder 700 is configured to receive, from the input interface 600, a bit distribution value for each encoded signal as indicated in block 620. This bit distribution value illustrated at 536 in FIG. 12 is forwarded to block 720 so that the signal decoder 700 determines the used bit distribution. Advantageously, the same steps as have been explained with respect to the encoder-side in FIG. 6 and FIG. 9, i.e., steps 290, 291, 292, 293 are performed by means of the signal decoder 700 for the purpose of the determination of the used bit distribution in block 720 of FIG. 12. In block 710/730, an individual decoding is performed in order to obtain the input into the joint signal processor 800 of FIG. 10.

The joint signal processor 800 has a band replication, bandwidth extension or intelligent gap filling processing functionality using certain side information included in the side information block 532. This side information is forwarded to block 810 and block 820 performs the joint stereo (decoder) processing using the result of the bandwidth extension procedure as applied by block 810. In block 810, the intelligent gap filling procedure is configured to transform a source range from one stereo representation to another stereo representation, when a destination range of the bandwidth extension or IGF processing is indicated as having the other stereo representation. When the destination range is indicated to have a mid/side stereo mode, and when the source range is indicated to have an L/R stereo mode, the L/R source range stereo mode is transformed into a mid/side source range stereo mode and, then, the IGF processing is performed with the mid/side stereo mode representation of the source range.

Figure 14:
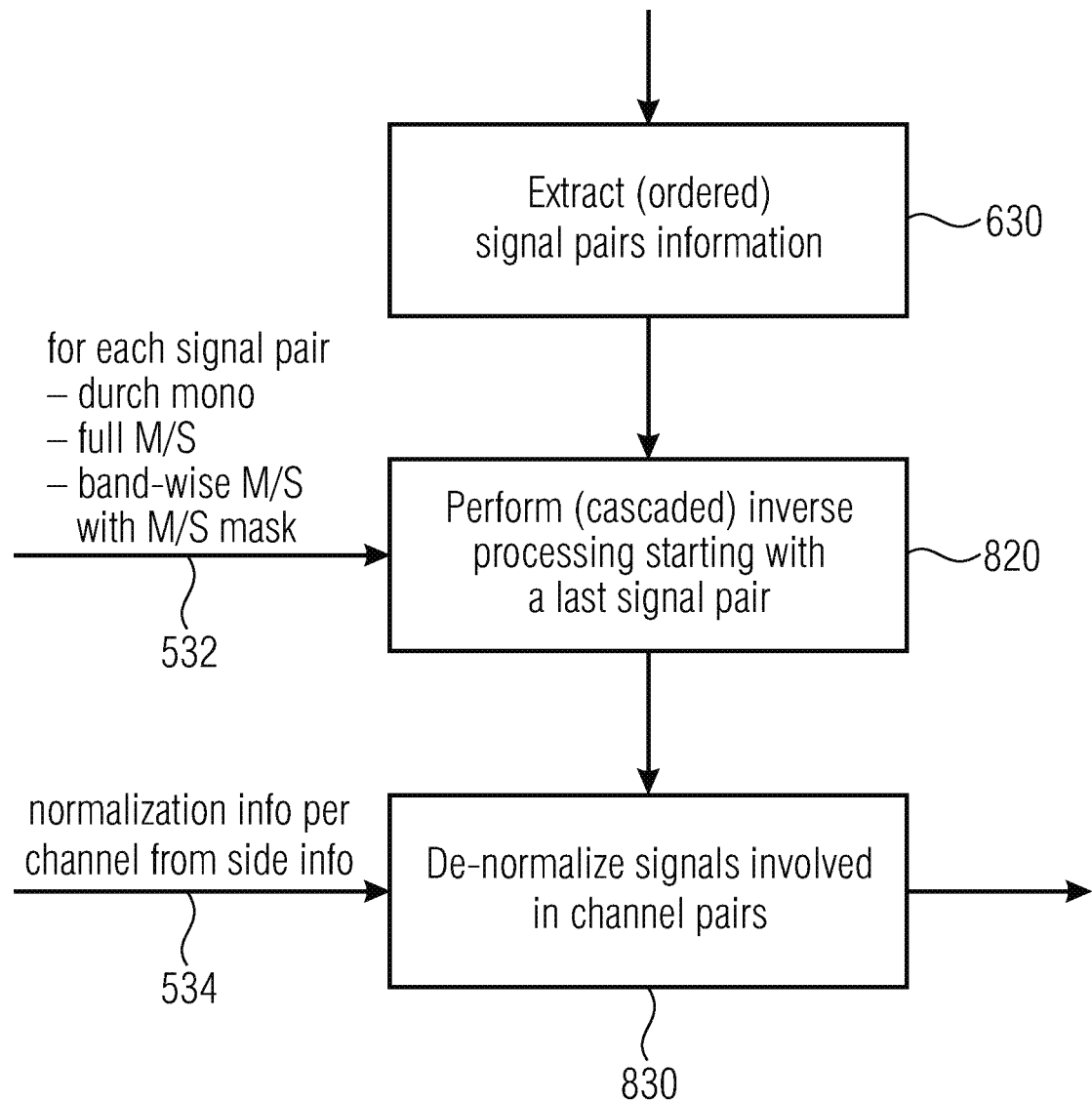
FIG. 14 illustrates a further advantageous implementation of the joint signal processor of FIG. 10.

FIG. 14 illustrates an implementation of the joint signal processor 800. The joint signal processor is configured to extract ordered signal pairs information as illustrated in block 630. This extraction can be performed by the input interface 600 or the joint signal processor can extract this information from the output of the input interface or can directly extract the information without a specific input interface as is also the case for other extraction procedures described with respect to the joint signal processor or the signal decoder.

In block 820, the joint signal processor performs an advantageously cascaded inverse processing starting with a last signal pair, where the term "last" refers to the processing order determined and performed by the encoder. In the decoder, the "last" signal pair is the one that is processed first. Block 820 receives side information 532 which indicate, for each signal pair indicated by the signal pairs information illustrated in block 630 and, for example, implemented in the way as explained with respect to FIG. 4, whether the specific pair was a dual mono, a full MS or a band-wise MS procedure with an associated MS mask.

Subsequently to the inverse processing in block 820, a de-normalization of the signals involved in the channel pairs is performed in the block 830 once again relying on side information 534 indicating a normalization information per channel. The de-normalization illustrated with respect to block 830 in FIG. 14 is advantageously a rescaling using the energy normalization value as downscaling when a flag 534a has a first value, and to perform the rescaling as an upscaling when the flag 534a has the second value, which is different from the first value.

Figure 15A:
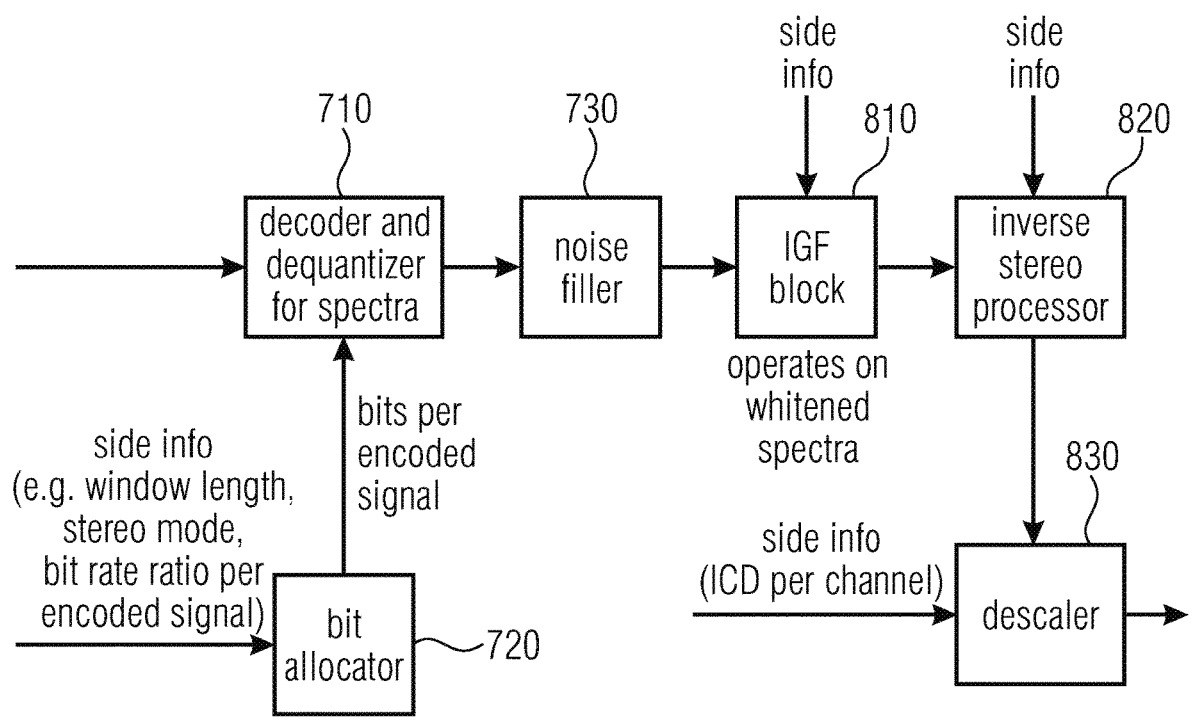
FIG. 15a illustrates advantageous processing blocks performed by the signal decoder and the joint signal processor of FIG. 10.
Figure 15B:
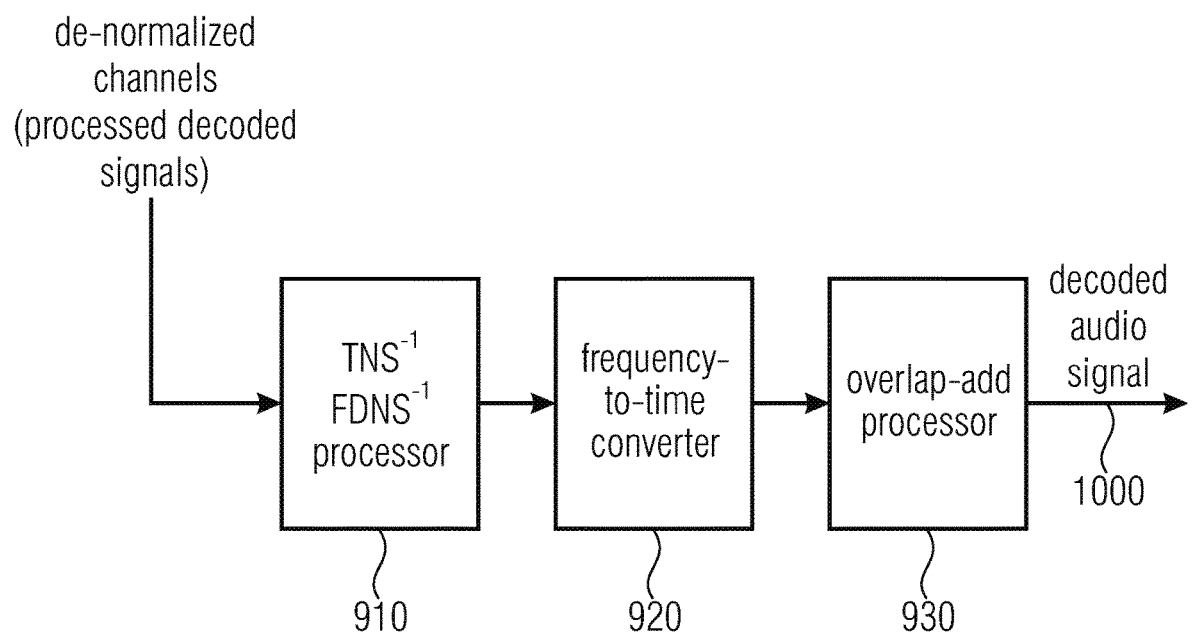
FIG. 15b illustrates an implementation of the post processor for performing a de-whitening operation and optional other procedures.

FIG. 15a illustrates an implementation as a block diagram of the signal decoder and the joint signal processor of FIG. 10, and FIG. 15b illustrates a block diagram representation of an implementation of the post-processor 900 of FIG. 10.

The signal decoder 700 comprises a decoder and dequantizer stage 710 for the spectra included in the encoded signal 500. The signal decoder 700 comprises a bit allocator 720 that receives, as a side information, advantageously the window length, the certain stereo mode and the bit allocation information per encoded signal. The bit allocator 720 performs the bit allocation particularly using, in an implementation, steps 290, 291, 292, 293, where the bit allocation information per encoded signal is used in step 291, and where information on the window length and the stereo mode are used in block 290 or 291.

In block 730, a noise filling also advantageously using noise filling side information is performed for ranges in the spectrum that are quantized to zero and that are not within the IGF range. Noise filling is advantageously limited to a low band portion of the signal output by block 710. In block 810, and using certain side information, an intelligent gap filling or generally bandwidth extension processing is performed that, importantly, operates on whitened spectra.

In block 820, and using side information, the inverse stereo processor performs the procedures to undo the processing performed in FIG. 2, items 240. The final descaling is performed using the transmitted quantized ILD parameter per channel that is included in the side information. The output of block 830 is input into block 910 of the post-processor that performs an inverse TNS processing and/or an inverse frequency domain noise shaping processing or any other dewhitening operation. The output of block 910 is a straightforward spectrum that is converted into the time domain by a frequency-to-time converter 920. The outputs of block 920 for adjacent frames are overlap-added in an overlap-add processor 930 in accordance with the certain coding or decoding rule to finally obtain from the overlap operation the multiplicity of decoded audio signals, or, generally, the decoded audio signal 1000. This signal 1000 can consist of individual channels or can consist of components of a sound field description such as Ambisonics components, or can consist of any other components in a higher order Ambisonics description. The signal can also be a signal of an A-format or a B-format or any other format description of a sound field. All these alternatives are collectively indicated as the decoded audio signal 1000 in FIG. 15*b*.

Subsequently, further advantages and specific features of embodiments are indicated.

The scope of this invention is to provide a solution for principles from [6] when processing perceptually whitened and ILD compensated signals.

FDNS with the rate-loop as described in [8] combined with the spectral envelope warping as described in [9] provides simple yet very effective way separating perceptual shaping of quantization noise and rate-loop.

Using mean energy level for all channels of the FDNS-whitened spectrum allows simple and effective way of deciding if there is an advantage of M/S processing as described in [7] for each channel pair that is selected for joint coding.

Coding single broadband ILD for each channel for the described system is enough and thus bit saving is achieved in contrast to known approaches.

By selecting channel pairs for joint coding with highly cross-correlated signals usually leads to a full spectrum M/S transform, therefore there is an additional mean bit saving as signaling M/S or L/R for each band is mostly replaced with a single bit of signaling full M/S transform.

Flexible and simple bit distribution based on the energies of the processed channels.

Features of Preferred Embodiments

As described in previous paragraphs, in this implementation, the codec uses new means to merge the flexibility of signal adaptive joint coding of arbitrary channels as described in [6] by introducing the concepts described in [7] for joint stereo coding. The novelty of the proposed invention is summarized in the following differences:

The joint processing for each channel-pair differs from the multi-channel processing described in [6] with regards to the global ILD compensation. The global ILD equalizes the level of the channels before selecting the channel pairs and doing M/S decision and processing and thus enables a more efficient stereo coding especially of panned sources.

The joint processing for each channel-pair differs from the stereo processing described in [7] with regards to the global ILD compensation. In the proposed system, there is no global ILD compensation for each channel-pair. In order to be able to use the M/S decision mechanism as described in [7] for arbitrary channels, there is normalization of all channels to a single energy level, i.e. a mean energy level. This normalization takes place before selecting the channel—pairs for joint processing.

After the adaptive channel-pair selection process, if there are channels that are not part of a channel pair for joint processing, their energy level is inverted to the initial energy level.

Bit distribution for entropy coding is not implemented on each channel pair as described in [7]. Instead, all channel energies are taken into account and the bits are distributed as described in the respective paragraph in this document.

There is an explicit "low-complexity" mode of the adaptive channel-pair selection described in [6], where a single channel that is part of a channel-pair during the iterative channel-pair selection process is not allowed to be part of another channel-pair during the next iteration of the channel pair selection process.

The advantage of using simple band-wise M/S for each channel pair and therefore, decreasing the amount of information that needs to be transmitted within the bitstream is enhanced by the fact that we are using the signal adaptive channel-pair selection of [6]. By choosing highly correlated channel to jointly code, a broadband M/S transform is optimal for most cases, i.e. M/S coding is used for all bands. This can be signalled with a single bit and therefore needs significantly less signalling information compared to a band-wise M/S decision. It significantly decreases the total amount of information bits that need to be transmitted for all channel pairs.

Embodiments of the invention relate to a signal adaptive joint coding of a multichannel system with perceptually whitened and ILD compensated spectra, where joint coding consists of a simple per band M/S transform decision based on the estimated number of bits for an entropy coder.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

These references are all incorporated herein by reference in their entirety.

[1] "Information technology-MPEG audio technologies Part 3: Unified speech and audio coding," ISO/IEC 23003-3, 2012.
[2] "Information technology-MPEG audio technologies Part 1: MPEG Surround," ISO/IEC 23003-1, 2007.
[3] J. Herre, J. Hilpert, K. Achim and J. Plogsties, "MPEG-H 3D Audio—The New Standard for Coding of Immersive Spatial Audio," *Journal of Selected Topics in Signal Processing*, vol. 5, no. 9, pp. 770-779, August 2015.
[4] "Digital Audio Compression (AC-4) Standard," ETSI TS 103 190 V1.1.1, 2014-04.
[5] D. Yang, H. Ai, C. Kyriakakis and C. Kuo, "High-fidelity multichannel audio coding with Karhunen-Loeve transform," *Transactions on Speech and Audio Processing*, vol. 11, no. 4, pp. 365-380, July 2003.
[6] F. Schuh, S. Dick, R. Füg, C. R. Helmrich, N. Rettelbach and T. Schwegler, "Efficient Multichannel Audio Transform Coding with Low Delay and Complexity," in *AES Convention*, Los Angeles, Sep. 20, 2016.
[7] G. Markovic, E. Fotopoulou, M. Multrus, S. Bayer, G. Fuchs, J. Herre, E. Ravelli, M. Schnell, S. Doehla, W. Jaegers, M. Dietz and C. Helmrich, "Apparatus and method for mdct m/s stereo with global ild with improved mid/side decision". International Patent WO2017125544A1, 27 Jul. 2017.
[8] 3GPP TS 26.445, *Codec for Enhanced Voice Services (EVS); Detailed algorithmic description.*
[9] G. Markovic, F. Guillaume, N. Rettelbach, C. Helmrich and B. Schubert, "Linear prediction based coding scheme using spectral domain noise shaping". EU Patent 2676266 B1, 14 Feb. 2011.
[10] S. Disch, F. Nagel, R. Geiger, B. N. Thoshkahna, K. Schmidt, S. Bayer, C. Neukam, B. Edler and C. Helmrich, "Audio Encoder, Audio Decoder and Related Methods Using Two-Channel Processing Within an Intelligent Gap Filling Framework". International Patent PCT/EP2014/065106, 15 Jul. 2014.
[11] "Codec for Enhanced Voice Services (EVS); Detailed algorithmic description," 3GPP TS 26.445 V 12.5.0, December 2015.
[12] "Codec for Enhanced Voice Services (EVS); Detailed algorithmic description," 3GPP TS 26.445 V 13.3.0, September 2016.
[13] Sascha Dick, F. Schuh, N. Rettelbach, T. Schwegler, R. Fueg, J. Hilpert and M. Neusinger, "APPARATUS AND METHOD FOR ENCODING OR DECODING A MULTICHANNEL SIGNAL". International Patent PCT/EP2016/054900, 8 Mar. 2016.

The invention claimed is:

1. Multisignal encoder for encoding at least three audio signals, comprising:
    a signal preprocessor for individually preprocessing each audio signal to acquire at least three preprocessed audio signals, wherein the preprocessing is performed so that a preprocessed audio signal is whitened with respect to the signal before preprocessing;
    an adaptive joint signal processor for performing a processing of the at least three preprocessed audio signals subsequent to an energy level normalization performed by the adaptive joint signal processor to acquire, in a first alternative, at least three jointly processed signals or, in a second alternative, at least two jointly processed signals and an unprocessed signal,
    wherein, for performing the energy level normalization, the adaptive joint signal processor is configured to:
    calculate an information on a mean energy of the preprocessed audio signals;
    calculate an information on an energy of each preprocessed audio signal,
    calculate a broadband energy normalization value for a specific preprocessed audio signal based on the information on the mean energy and the information on the energy of the specific preprocessed audio signal, and
    perform a broadband energy normalization of the at least three preprocessed audio signals using the broadband energy normalization values for the specific preprocessed audio signals, wherein each preprocessed audio signal has a normalized energy due to the performing the broadband energy normalization;

wherein the adaptive joint signal processor is configured:
to calculate cross-correlation values for each possible signal pair of the preprocessed signals having the normalized energies of the at least three preprocessed signals;
to select the signal pair having the highest cross-correlation value;
to determine a joint stereo processing mode for the selected signal pair; and
to joint stereo process the selected signal pair in accordance with the determined joint stereo processing mode to obtain a processed signal pair;
a signal encoder for encoding each signal to acquire one or more encoded signals; and
an output interface for transmitting or storing an encoded multisignal audio signal comprising the one or more encoded signals, side information relating to the preprocessing comprising the broadband energy normalization values for the preprocessed audio signals and side information relating to the processing.

2. Multisignal encoder of claim 1,
wherein the adaptive joint signal processor is configured to calculate a scaling ratio as the broadband energy normalization value for the specific preprocessed audio signal from the mean energy and the energy of the specific preprocessed audio signal, and
wherein the adaptive joint signal processor is configured for determining a flag indicating whether the scaling ratio is for an upscaling or a downscaling, and wherein the flag for each preprocessed audio signal is comprised by the side information relating to the processing.

3. The multisignal encoder of claim 2,
wherein the adaptive joint signal processor is configured to quantize the scaling ratio into the same quantization range irrespective of whether the scaling is an upscaling or a downscaling.

4. Multisignal encoder of claim 1, wherein the adaptive joint signal processor is configured to apply a cascaded signal pair processing, or wherein the adaptive joint signal processor is configured to apply a non-cascaded signal pair processing,
wherein, in the cascaded signal pair processing, the signals of a processed signal pair are selectable in a further iteration step comprising a calculation of updated cross-correlation values, selecting the signal pair comprising the highest cross-correlation value, the determination of a joint stereo processing mode for the selected signal pair and the joint stereo processing the selected signal pair in accordance with the determined joint stereo processing mode, or
wherein, in the non-cascaded signal pair processing, the signals of a processed signal pair are not selectable in an additional selecting the signal pair comprising the highest cross-correlation value, the determination of a joint stereo processing mode for the selected signal pair, and the joint stereo processing the selected signal pair in accordance with the determined joint stereo processing mode.

5. Multisignal encoder claim 1,
wherein the adaptive joint signal processor is configured to determine the signal to be encoded individually as a signal remaining subsequent to a pairwise processing procedure, and
wherein the adaptive joint signal processor is configured to modify an energy normalization applied to the signal before performing the pairwise processing procedure such as reverting, or at least partly reverting the energy normalization applied to the signal before performing the pairwise processing procedure.

6. The multisignal encoder of claim 1,
wherein the adaptive joint signal processor is configured for calculating a scaling factor for each signal based on the information on the energy for the specific signal and the information on the mean energy of the at least three preprocessed audio signals,
wherein the adaptive joint signal processor is configured for quantizing the scaling ratio to acquire a quantized scaling ratio value, the quantized scaling ratio value being used for deriving side information for the scaling ratio for each signal comprised by to the encoded multisignal audio signal, and
wherein the adaptive joint signal processor is configured to derive, from the quantized scaling ratio value, a quantized scaling ratio, wherein the preprocessed audio signal is scaled using the quantized scaling ratio before being used for the pairwise processing of the scaled signal with another correspondingly scaled signal.

7. The multisignal encoder of claim 1,
wherein the adaptive joint signal processor is configured for calculating normalized inter-signal cross-correlation values for the possible signal pairs in order to decide and select which signal pair comprises the highest degree of similarities and, therefore, is suitable to be selected as a pair for pairwise processing of the at least three preprocessed audio signals,
wherein the normalized cross-correlation values for each signal pair are stored in a cross-correlation vector, and
wherein the adaptive joint signal processor is configured for determining, whether a signal pair selection of one or more previous frames is to be retained or not by com-paring a cross-correlation vector of the previous frame to the cross-correlation vector of the current frame, and wherein the signal pair selection of the previous frame is retained, when a difference between the cross-correlation vector of the current frame and the cross-correlation vector of the previous frame is lower than a predefined threshold.

8. The multisignal encoder of claim 1,
wherein the adaptive joint signal processor is configured to apply a non-cascaded signal-pair processing, in which the signals of the processed signal pair are not selectable in a further signal pair processing, wherein the adaptive joint signal processor is configured for selecting the signal pairs based on a cross-correlation between the signal pairs for the pairwise processing, and wherein the pairwise processing of several selected signal pairs is performed in parallel.

9. The multisignal encoder of claim 8,
wherein the adaptive joint signal processor is configured to determine, for a selected signal pair, a stereo encoding mode, and wherein, when the stereo encoding mode is determined to be a dual mono mode, the signals involved in this signal pair are at least partly rescaled and indicated as signals to be encoded individually.

10. The multisignal encoder of claim 1,
wherein the adaptive joint signal processor is configured for performing an intelligent gap filling operation, before a result of the IGF operation is individually encoded by the signal encoder,
wherein a power spectrum is used for a tonality/noise determination in a quantization and intelligent gap filling, and wherein the signal preprocessor is configured for performing the same frequency domain noise shaping for an MDST spectrum as has been applied to the MDCT spectrum, and wherein the adaptive joint signal processor is configured for performing the same mid/side processing to a preprocessed MDST spectrum, so that a result of a processed MDST spectrum is used within a quantization performed by the signal encoder or within an intelligent gap filling processing performed by the adaptive joint signal processor, or wherein the adaptive joint signal processor is configured for applying the same normalization scaling based on the full band scaling vector for the MDST spectrum as it was done for the MDCT spectrum using the same quantized scaling vectors.

11. A multisignal decoder for decoding an encoded audio signal comprising at least three encoded signals and, as side information, energy normalization values for joint stereo decoded signals, joint stereo side information, and whitening side information, the multisignal decoder comprising:

a signal decoder for decoding the at least three encoded signals to obtain decoded signals;

a joint signal processor configured to extract, from the encoded audio signal, the energy normalization values for the joint stereo decoded signals, and the joint stereo side information, to perform a joint signal processing comprising a pairwise processing the decoded signals using a joint stereo mode as indicated by the joint stereo side information to obtain the joint stereo decoded signals, and to energy re-scale the joint stereo decoded signals using the energy normalization values for the joint stereo decoded signals to acquire at least three processed decoded signals; and a post processor for post processing the at least three processed decoded signals in accordance with the whitening side information extracted from the encoded audio signal to obtain post processed signals, wherein the post processing is performed so that the post processed signals are less white than the corresponding at least three processed decoded signals, and wherein the post processed signals represent a decoded audio signal.

12. The multisignal decoder of claim 11, wherein the joint signal processor is configured to check, whether an energy normalization value extracted from the encoded audio signal for a specific signal comprises a predefined value, and wherein the joint signal processor is configured to not perform an energy re-scaling or to only perform a reduced energy re-scaling to the specific signal, when the energy normalization value comprises the predefined value.

13. The multisignal decoder of claim 11, wherein the joint signal processor is configured for extracting from the encoded audio signal, a flag, indicating whether the energy normalization value is either an upscaling value or a downscaling value, and to perform the energy rescaling using the energy normalization value as a downscaling, when the flag comprises a first value and as an upscaling, when the flag comprises the second value different from the first value.

14. The multisignal decoder of claim 11, wherein the joint signal processor is configured to extract, from the encoded audio signal, a side information indicating signal pairs that result from a jointly coding operation, to perform an inverse stereo or multichannel processing starting with a last signal pair used to acquire the encoded audio signal, in order to convert back to original preprocessed spectra of each signal, and to perform the inverse stereo processing based on the stereo mode and/or a bandwise mid/side decision as indicated in the side information for the encoded audio signal.

15. The multisignal decoder of claim 11, wherein the joint signal processor is configured to de-normalize all signals involved in signal pairs to a corresponding original energy level based on quantized energy scaling information comprised for each individual signal, and wherein other signals that were not involved in signal pair processing are not de-normalized as the signals involved in signal pair processing.

16. A method for performing multisignal encoding at least three audio signals, comprising:

individually preprocessing each audio signal to acquire at least three preprocessed audio signals, wherein the preprocessing is performed so that a preprocessed audio signal is whitened with respect to the signal before preprocessing;

performing a processing of the at least three preprocessed audio signals subsequent to an energy level normalization to acquire, in a first alternative, at least three jointly processed signals or, in a second alternative, at least two jointly processed signals and an unprocessed signal, wherein the energy level normalization comprises:

calculating an information on a mean energy of the preprocessed audio signals;

calculating an information on an energy of each preprocessed audio signal, calculating a broadband energy normalization value for a specific preprocessed audio signal based on the information on the mean energy and the information on the energy of the specific preprocessed audio signal, and performing a broadband energy normalization of the at least three preprocessed audio signals using the broadband energy normalization values for the specific preprocessed audio signals, wherein each preprocessed audio signal has a normalized energy due to the performing the broadband energy normalization;

wherein the performing of the processing of the at least three preprocessed audio signals comprises:

calculating cross-correlation values for each possible signal pair of the preprocessed signals having the normalized energies of the at least three preprocessed signals;

selecting the signal pair having the highest cross-correlation value;

determining a joint stereo processing mode for the selected signal pair; and joint stereo processing the selected signal pair in accordance with the determined joint stereo processing mode to obtain a processed signal pair;

encoding each signal to acquire one or more encoded signals; and transmitting or storing an encoded multisignal audio signal comprising the one or more encoded signals, side information relating to the preprocessing and side information relating to the processing comprising the broadband energy normalization values for the preprocessed audio signals.

17. A method for multisignal decoding an encoded audio signal comprising at least three encoded signals and, as side information, energy normalization values for joint stereo decoded signals, joint stereo side information, and whitening side information, the method comprising:
- individually decoding at least three encoded signals to obtain decoded signals;
- performing a joint signal processing comprising
- extracting, from the encoded audio signal, the energy normalization values for the joint stereo decoded signals, and the joint stereo side information,
- performing a joint signal processing comprising a pairwise processing the decoded signals using a joint stereo mode as indicated by the joint stereo side information to obtain the joint stereo decoded signals, and
- energy re-scaling the joint stereo decoded signals using the energy normalization values for the joint stereo decoded signals to acquire at least three processed decoded signals; and
- post processing the at least three processed decoded signals in accordance with the whitening side information extracted from the encoded audio signal to obtain post processed signals, wherein the post processing is performed so that the corresponding post processed signals are less white than the at least three processed decoded signals, and wherein the post processed signals represent a decoded audio signal.

18. A non-transitory digital storage medium having a computer program stored thereon to perform the method for performing multisignal encoding at least three audio signals, comprising:
- individually preprocessing each audio signal to acquire at least three preprocessed audio signals, wherein the preprocessing is performed so that a preprocessed audio signal is whitened with respect to the signal before preprocessing;
- performing a processing of the at least three preprocessed audio signals subsequent to an energy level normalization to acquire, in a first alternative, at least three jointly processed signals or, in a second alternative, at least two jointly processed signals and an unprocessed signal,
- wherein the energy level normalization comprises:
- calculating an information on a mean energy of the preprocessed audio signals;
- calculating an information on an energy of each preprocessed audio signal,
- calculating a broadband energy normalization value for a specific preprocessed audio signal based on the information on the mean energy and the information on the energy of the specific preprocessed audio signal, and
- performing a broadband energy normalization of the at least three preprocessed audio signals using the broadband energy normalization values for the specific preprocessed audio signals, wherein each preprocessed audio signal has a normalized energy due to the performing the broadband energy normalization,
- wherein the performing of the processing of the at least three preprocessed audio signals comprises:
- calculating cross-correlation values for each possible signal pair of the preprocessed signals having the normalized energies of the at least three preprocessed signals;
- selecting the signal pair having the highest cross-correlation value;
- determining a joint stereo processing mode for the selected signal pair; and
- joint stereo processing the selected signal pair in accordance with the determined joint stereo processing mode to obtain a processed signal pair;
- encoding each signal to acquire one or more encoded signals; and
- transmitting or storing an encoded multisignal audio signal comprising the one or more encoded signals, side information relating to the preprocessing and side information relating to the processing comprising the broadband energy normalization values for the preprocessed audio signals, when said computer program is run by a computer.

19. A non-transitory digital storage medium having a computer program stored thereon to perform the method for multisignal decoding an encoded signal comprising at least three encoded signals and, as side information, energy normalization values for joint stereo decoded signals, joint stereo side information, and whitening side information, the method comprising:
- individually decoding at least three encoded signals to obtain decoded signals;
- performing a joint signal processing comprising
- extracting, from the encoded signal, the energy normalization values for the joint stereo decoded signals, and the joint stereo side information,
- performing a joint signal processing comprising a pairwise processing the decoded signals using a joint stereo mode as indicated by the joint stereo side information to obtain the joint stereo decoded signals, and
- energy re-scaling the joint stereo decoded signals using the energy normalization values for the joint stereo decoded signals to acquire at least three processed decoded signals; and
- post processing the at least three processed decoded signals in accordance with the whitening side information extracted from the encoded audio signal to obtain post processed signals, wherein the post processing is performed so that the corresponding post processed signals are less white than the at least three processed decoded signals, and wherein the post processed signals represent a decoded audio signal, when said computer program is run by a computer.

* * * * *